United States Patent
Fanselow et al.

(10) Patent No.: US 6,273,938 B1
(45) Date of Patent: Aug. 14, 2001

(54) CHANNEL FLOW FILTER

(75) Inventors: Dan L. Fanselow, White Bear Lake; Roberto C. Moreno, Inver Grove Heights; Thanh H. Pham, Minneapolis; Michele H. Kelley, St. Paul, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/374,148

(22) Filed: Aug. 13, 1999

(51) Int. Cl.[7] ............................. B01D 29/07; B01D 53/04
(52) U.S. Cl. ........................... 95/90; 95/143; 96/135; 96/153; 96/154; 55/497; 55/514; 55/521; 55/528; 55/DIG. 5
(58) Field of Search ................................. 95/90, 143–147; 96/134, 135, 142, 153, 154; 55/440, 497–499, 511, 514, 521, 528, DIG. 5

(56) References Cited

U.S. PATENT DOCUMENTS

| | | | |
|---|---|---|---|
| Re. 30,782 | 10/1981 | Van Turnhout . | |
| Re. 31,285 | 6/1983 | Van Turnhout et al. . | |
| 2,019,186 | * 10/1935 | Kaiser | 55/521 X |
| 2,038,071 | * 4/1936 | Wilhelm | 96/153 X |
| 2,286,479 | * 6/1942 | Farr | 55/521 X |
| 2,486,728 | * 11/1949 | Asad | 55/521 X |
| 2,567,030 | * 9/1951 | Schaaf | 55/497 X |
| 2,653,676 | * 9/1953 | Breckheimer | 55/521 X |
| 2,764,257 | * 9/1956 | Brixius | 55/521 X |
| 2,988,469 | 6/1961 | Watson . | |

(List continued on next page.)

FOREIGN PATENT DOCUMENTS

| | | | |
|---|---|---|---|
| 3028385 | 2/1982 | (DE) | B01D/13/00 |
| 0338354 | 10/1989 | (EP) . | |
| 0492879 | 7/1992 | (EP) . | |
| 0617995 | 10/1994 | (EP) . | |
| 0839569 | 5/1998 | (EP) . | |
| 0867217 | 9/1998 | (EP) . | |
| 2199479 | * 4/1974 | (FR) | 96/134 |
| 53-64675 | 6/1978 | (JP) . | |
| 54-112378 | 3/1979 | (JP) . | |
| 54-29872 | 6/1979 | (JP) . | |
| 55-64824 | 5/1980 | (JP) . | |
| 56-31423 | 3/1981 | (JP) . | |
| 56-024016 | * 3/1981 | (JP) | 96/154 |
| 57-207525 | 12/1982 | (JP) . | |
| 58-137443 | 8/1983 | (JP) . | |
| 59-132919 | 7/1984 | (JP) . | |
| 2-194835 | 8/1990 | (JP) . | |
| 2-203914 | 8/1990 | (JP) . | |
| 3-238011 | * 10/1991 | (JP) | 96/134 |
| 5-68832 | 3/1993 | (JP) . | |
| 7-289844 | 11/1995 | (JP) . | |
| 8-126840 | 5/1996 | (JP) . | |
| WO 95/05232 | 2/1995 | (WO) . | |
| WO 97/30199 | 8/1997 | (WO) . | |
| WO 97/44120 | 11/1997 | (WO) . | |
| WO 98/07504 | 2/1998 | (WO) | B01D/53/94 |
| WO 99/27875 | 6/1999 | (WO) . | |
| WO 99/28542 | 6/1999 | (WO) . | |

*Primary Examiner*—Robert H. Spitzer

(57) ABSTRACT

Channel flow filtration media possessing high efficiency and low pressure drop is formed from a plurality of filtration layers at least some of which include a multi-dimensional channel pattern having a plurality of continuous, tortuous channels and a multi-dimensional edge at each end of the plurality of channels formed therein. The filtration medium is configured as a stack with the multi-dimensional edge of the channel pattern forming a plurality of inlets open through a first face of the stack, a plurality of outlets open through a second face of the stack, and a corresponding plurality of disruptive fluid pathways passing from the inlets through the stack to the outlets. The filtration layers may be formed from a non-woven material, such as a carbon loaded multi-layer BMF web capable of adsorption of undesired vapors and odors from a fluid.

49 Claims, 14 Drawing Sheets

U.S. PATENT DOCUMENTS

| | | | |
|---|---|---|---|
| 3,358,427 | * 12/1967 | Bub | 55/497 X |
| 3,482,375 | * 12/1969 | Ellingen | 55/440 X |
| 3,616,623 | * 11/1971 | Reid | 55/440 |
| 3,801,400 | 4/1974 | Vogt et al. . | |
| 3,971,373 | 7/1976 | Braun . | |
| 3,982,981 | 9/1976 | Takao et al. . | |
| 4,100,324 | 7/1978 | Anderson et al. . | |
| 4,215,682 | 8/1980 | Kubik et al. . | |
| 4,333,749 | * 6/1982 | Holmberg et al. | 55/440 X |
| 4,386,947 | 6/1983 | Mizuno et al. . | |
| 4,429,001 | 1/1984 | Kolphin et al. . | |
| 4,516,988 | 5/1985 | Winter . | |
| 4,537,812 | * 8/1985 | Elbers | 55/497 X |
| 4,589,983 | 5/1986 | Wydevan . | |
| 4,592,815 | 6/1986 | Nakao . | |
| 4,659,323 | 4/1987 | Ito et al. . | |
| 4,668,558 | 5/1987 | Barber . | |
| 4,741,949 | 5/1988 | Morman et al. . | |
| 4,797,318 | 1/1989 | Brooker et al. . | |
| 4,798,850 | 1/1989 | Brown . | |
| 4,902,418 | * 2/1990 | Ziegler | 55/521 X |
| 5,025,052 | 6/1991 | Carter et al. . | |
| 5,032,156 | 7/1991 | Luder et al. | 55/269 |
| 5,057,710 | 10/1991 | Nishiura et al. . | |
| 5,069,403 | 12/1991 | Marentic et al. . | |
| 5,084,178 | 1/1992 | Miller et al. . | |
| 5,099,026 | 3/1992 | Crater et al. . | |
| 5,133,516 | 7/1992 | Marentic et al. . | |
| 5,149,468 | 9/1992 | Hershelman . | |
| 5,175,030 | 12/1992 | Lu et al. . | |
| 5,190,812 | 3/1993 | Joseph et al. . | |
| 5,200,248 | 4/1993 | Thompson et al. . | |
| 5,238,733 | 8/1993 | Joseph et al. . | |
| 5,248,455 | 9/1993 | Joseph et al. . | |
| 5,258,220 | 11/1993 | Joseph . | |
| 5,288,298 | 2/1994 | Aston . | |
| 5,306,321 | 4/1994 | Osendorf . | |
| 5,308,703 | * 5/1994 | Tsujimoto et al. | 96/154 X |
| 5,352,274 | 10/1994 | Blakley . | |
| 5,356,852 | 10/1994 | DeLiso et al. . | |
| 5,368,910 | 11/1994 | Langdon . | |
| 5,387,376 | 2/1995 | Gasser . | |
| 5,405,434 | 4/1995 | Inculet . | |
| 5,417,743 | 5/1995 | Dauber . | |
| 5,462,538 | 10/1995 | Korpman . | |
| 5,472,481 | 12/1995 | Jones et al. . | |
| 5,477,891 | 12/1995 | Benesi . | |
| 5,486,410 | 1/1996 | Groeger et al. . | |
| 5,496,507 | 3/1996 | Angadjivand et al. . | |
| 5,505,769 | 4/1996 | Dinnage et al. . | |
| 5,560,878 | 10/1996 | Dragoo et al. . | |
| 5,651,900 | 7/1997 | Keller et al. . | |
| 5,656,368 | 8/1997 | Braun et al. . | |
| 5,674,339 | 10/1997 | Groeger et al. . | |
| 5,683,532 | 11/1997 | Kuma . | |
| 5,700,375 | 12/1997 | Hagen et al. . | |
| 5,753,343 | 5/1998 | Braun et al. . | |
| 5,763,078 | 6/1998 | Braun et al. . | |
| 5,792,244 | * 8/1998 | Morlec et al. | 96/135 |
| 5,804,295 | 9/1998 | Braun et al. . | |
| 5,865,864 | * 2/1999 | Brück | 55/521 X |
| 5,968,373 | * 10/1999 | Choi | 55/521 X |

\* cited by examiner

CHANNEL FLOW FILTER

FIELD OF THE INVENTION

The present invention relates to multi-layer filtration media having a plurality of continuous, tortuous channels.

BACKGROUND OF THE INVENTION

Filter structure for the removal of undesirable elements from a fluid or vapor has developed through the years to take advantage of newly developed materials and techniques. The introduction of non-woven webs as filter material subsequently led to the formation of pleated and corrugated structures from the non-woven materials in order to increase the surface area of the filter material exposed to the fluid, as well as decrease the pressure drop or resistance as the fluid passed through the material. Numerous techniques for the corrugation and use of corrugated non-woven webs have been developed as described, for example, in U.S. Pat. No. 5,753,343 (Braun et al.), including stacking of multiple layers of corrugated and non-corrugated material. In such previously developed examples, emphasis has typically been on increased surface area by using corrugations or channels formed from the filter material to pass straight across or through the ultimate filter.

Although improvements have been made to increase filter efficiency and decrease filter pressure drop or resistance, an ongoing need exists to still further provide improvements in these areas. Additionally, the development of new and different filter materials presents an ongoing challenge to utilize such materials effectively to produce efficient and cost effective filter applications. Further, improved adsorbent filters with increased efficiency at a desired pressure drop, or reduced pressure drop at a desired efficiency are also needed.

BRIEF SUMMARY OF THE INVENTION

The present invention meets the ongoing need for improvements in filter efficiency and pressure drop by providing filtration media possessing high efficiency and low pressure drop. The filtration medium includes a plurality of filtration layers at least some of which have a multi-dimensional channel pattern formed therein. The channel pattern includes a plurality of continuous, non-straight or tortuous channels formed across the filtration layer and a multi-dimensional edge at each end of the plurality of channels. The filtration medium may be configured as a stack of the filtration layers with the channel pattern and multi-dimensional edges forming a plurality of inlets open through a first face of the stack, a plurality of outlets open through a second face of the stack, and a corresponding plurality of disruptive fluid pathways passing from the inlets through the stack to the outlets.

Each channel of the plurality of channels may be formed as a smoothly undulating curve that is parallel to the other channels of the pattern. The plurality of channels may be formed with a radiused cross-section producing the multi-dimensional edge as a smoothly undulating curve. Alternatively, the channels may be formed as irregular, non-parallel curves. For example, the shape of a channel and the cross-sectional area of that channel may vary along its length. Additionally, the shape and cross-section of channels on a single layer of filtration media, or adjacent layers of media, can also vary. The channels may be formed by embossing, molding or other suitable methods.

The first and second faces of the filtration media may be opposite one another, adjacent one another, or may include a third face. The faces may be parallel or non-parallel as needed for a particular filter application. The filtration layers may include some layers having the channel pattern formed therein and some layers without a channel pattern formed therein, such as a planar sheet. These layers may be alternated when stacked to produce the filtration medium.

The filtration medium may be formed from various types of filtration material, including non-woven material and particulate loaded material. In one embodiment, a carbon loaded multi-layer BMF web formed the filtration layer producing a filtration medium capable of removing undesirable vapors and odors from a fluid.

The filtration medium of the present invention is highly versatile, allowing for numerous variations in channel configurations, layer configurations and stack configurations to produce a filter having the desired characteristics for a filter application. In addition, the filtration medium of the present invention may be formed with an efficiency similar to a conventional filter, but with a much lower pressure drop, or may be formed with a pressure drop similar to a conventional filter but with a much higher efficiency.

DETAILED DESCRIPTION OF THE INVENTION

Figure 1:
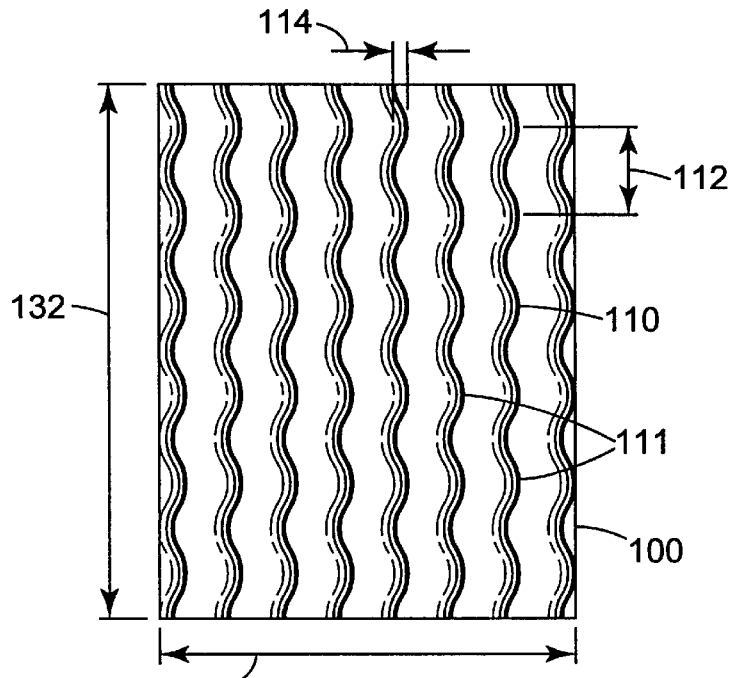
FIG. 1 is a plan view of one embodiment of a multiple channel pattern filter web of the present invention.

With reference to the attached Figures, it is to be understood that like components are labeled with like numerals throughout the several Figures. In the embodiment of FIG. 1, a channel pattern filter web 100 of the present invention is shown having a plurality of undulating channels 110 formed therein. The channel pattern filter web 100 has a width 130 and a length 132 defined by the web formation process, the channel formation process, and/or other factors. The channels 110 are regularly spaced across the web width 130. In the illustrated embodiment, each channel 111 is formed as a generally uniform undulating curve with a substantially sinusoidal shape. The undulating shape of each channel 111 has both wavelength 112 and amplitude 114 characteristics associated with it as the channel 111 passes along the length 132 of the filter web 100. Although the web 100 is shown with generally parallel channels having regular undulations, it is to be understood that the channels may be non-parallel and that the undulations may be irregular and vary from channel to channel, along the length of a single channel, and from web to web.

Figure 2:
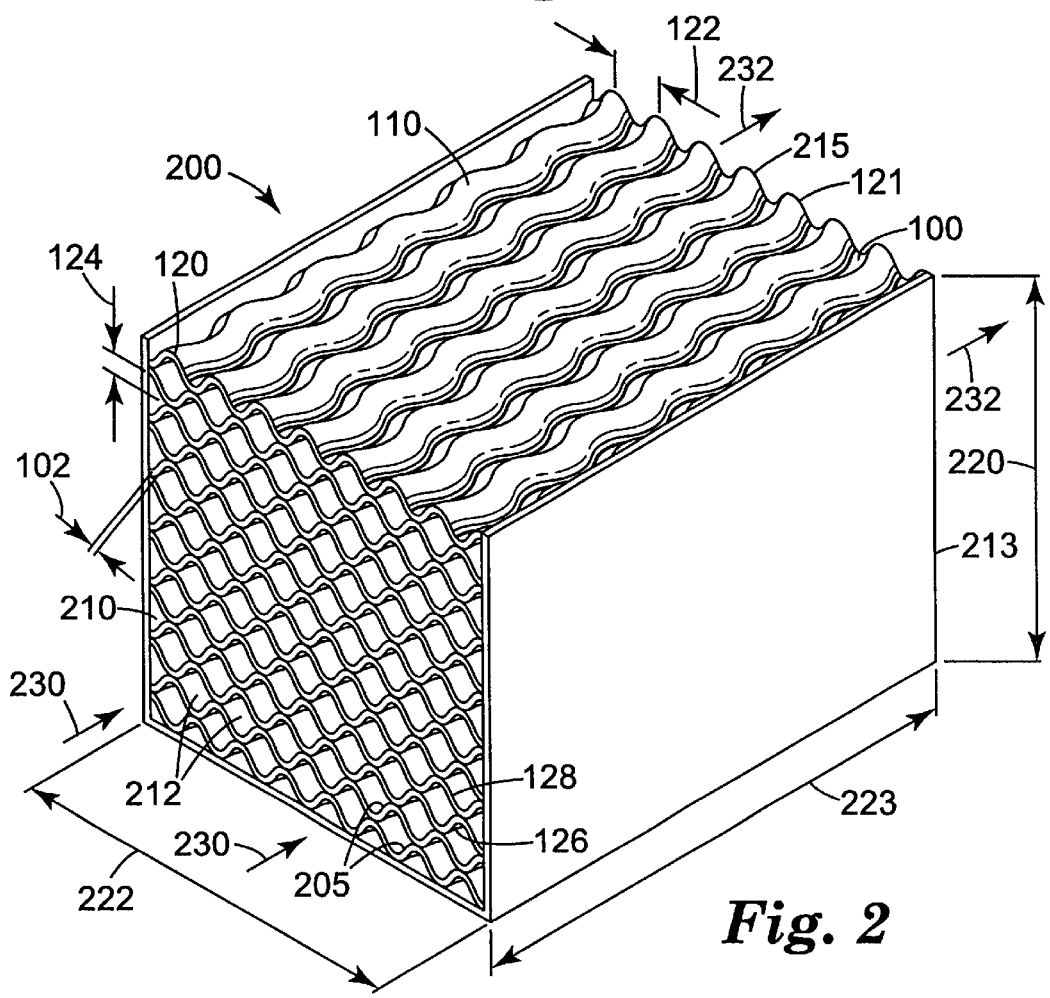
FIG. 2 is a perspective view of a stacked filter formed from multiple layers of the filter web of FIG. 1.

In FIG. 2, a stacked filter 200, also referred to as a channel flow filter, is shown that has improved efficiency and minimized pressure drop. In one embodiment, the filter web 100 is capable of adsorption of undesirable elements, such as vapors or odors, from a fluid. The stacked filter 200 is formed from a plurality of stacked layers 205 of channel pattern filter web 100. Each layer 205 of channel pattern filter web 100 includes two undulating edges 120, 121 one at each end of the channels 110 along the length 132 of filter layers 205. The undulating edges 120, 121 are formed from the radiused cross-sections of the plurality of channels 110 formed across the filter web 100, as described above. Each edge 120, 121 has both edge wavelength 122 and edge amplitude 124 characteristics associated with it, defining corresponding peaks 126 and valleys 128 that extend in a plane perpendicular to the plane of the filter layer 205. Although regular undulations are shown, it is to be understood that the undulations may also be irregular and may vary across a web or from one layer to another layer within a multi-layer filter.

The layers 205 are offset from each other when stacked so as to minimize the possibility of nesting of the layers 205 wherein the peaks 126 and valleys 128 of adjacent layers 205 are aligned and mesh together. Alternatively, adjacent layers 205 with channels 110 having different wavelengths, amplitudes or cross sections will also reduce the risk of nesting. As a result, first face 210 of the stacked filter 200 includes a plurality of inlets 212 created by the peaks 126 of one layer 205 contacting the valleys 128 of an adjacent layer 205. Second face 213 is located on the opposite side of the stacked filter 200 with corresponding outlets 215 created by the peaks 126 of one layer 205 contacting the valleys 128 of an adjacent layer 205. In an alternate embodiment, the channels 110 may be formed with a different cross-section, such as a square, rectangular or triangular shape, so that the edges 120, 121 have a corresponding wave-form shape, such as a square wave, rectangular wave or triangular wave, respectively.

The stacked filter 200 is formed from the multiple layers 205 of channel pattern filter web 100 stacked together to a height 220. The filter 200 has a width 222 equal to the width 130 of the filter web 100. Optionally, the filter 200 may have a width 222 less than the web width 130 if the web 100 is slit before filter formation, or greater than the web width 130 if the multiple webs 100 are positioned adjacent one another during filter formation. Once formed, the filter 200 may have a depth 223 equal to the length 132 of the channel pattern filter web 100. In one embodiment, the stacked filter 200 is skived to a predetermined depth 223 defined by the filter application for which the stacked filter 200 is to be used. In some situations, it may be desirable to use multiple stacked filters 200 placed adjacent one another to build up a desired filter assembly (not shown). Such filter assemblies will be described more below.

Each filter web 100 also has a web thickness 102 associated with it. In one embodiment, the web thickness 102 may range from about 0.05 millimeters to about 6 millimeters (about 0.002 to about 0.25 inches), but a range of about 0.8 millimeters to about 3 millimeters (about 0.03 to about 0.125 inches) may be more manageable. Since the thickness 102 of each web 100 may have an effect on the formation of the plurality of channels 110, the choice of web thickness 102 for a particular application may depend on the choice of channel size, amplitude and wave length, and thus may vary from the ranges given above. Although each layer 205 of the stacked filter 200 is shown with the same web thickness 102, it is to be understood that the web thickness 102 may vary from layer to layer, as well as across each individual filter layer 205.

In use, the stacked filter 200 is placed so that the first face 210 is substantially perpendicular to the primary fluid flow, represented by arrows 230. The fluid passes into the inlets 212 and travels along the plurality of undulating, tortuous and/or non-straight channels 110 as disruptive fluid pathways until it passes out of the stacked filter 200 at outlets 215, represented by arrows 232. It is believed that the majority of the adsorption achieved by the stacked filter 200 occurs by lateral diffusion during the fluid's passage along the channels 110, rather than by passage of the fluid through the channel pattern filter web layers 205. The disruptive pathways formed by the tortuous shape of the channels 110 causes a perturbation of the fluid as it passes down the length of the channel, as determined by the depth 223 of the filter 200. This perturbation of the fluid is an efficient way to introduce flow into the filter web 100, and thus increase the efficiency of the filter 200. The disruptive pathways formed by the channels 110 also increases the turbulence and mixing of the fluid within the channels 110, providing a better concentration gradient across each channel 111, which also helps improve the efficiency of the filter 200. Although in the filter web 100 embodiment shown in FIG. 1, it may be possible for a portion of the incoming fluid to travel a generally straight-line path down the center of some of the channels without contacting the filter web 100, such possibility is believed to be minimized by the perturbation and turbulence of the fluid created in the channels by the tortuous configuration of the channels. In other embodiments disclosed herein, the channels are shaped to preclude incoming fluid from traveling a straight path through the filter. It will be clear that the tortuousness of the channels can be increased or decreased depending upon the particular filtration application.

Figure 3:
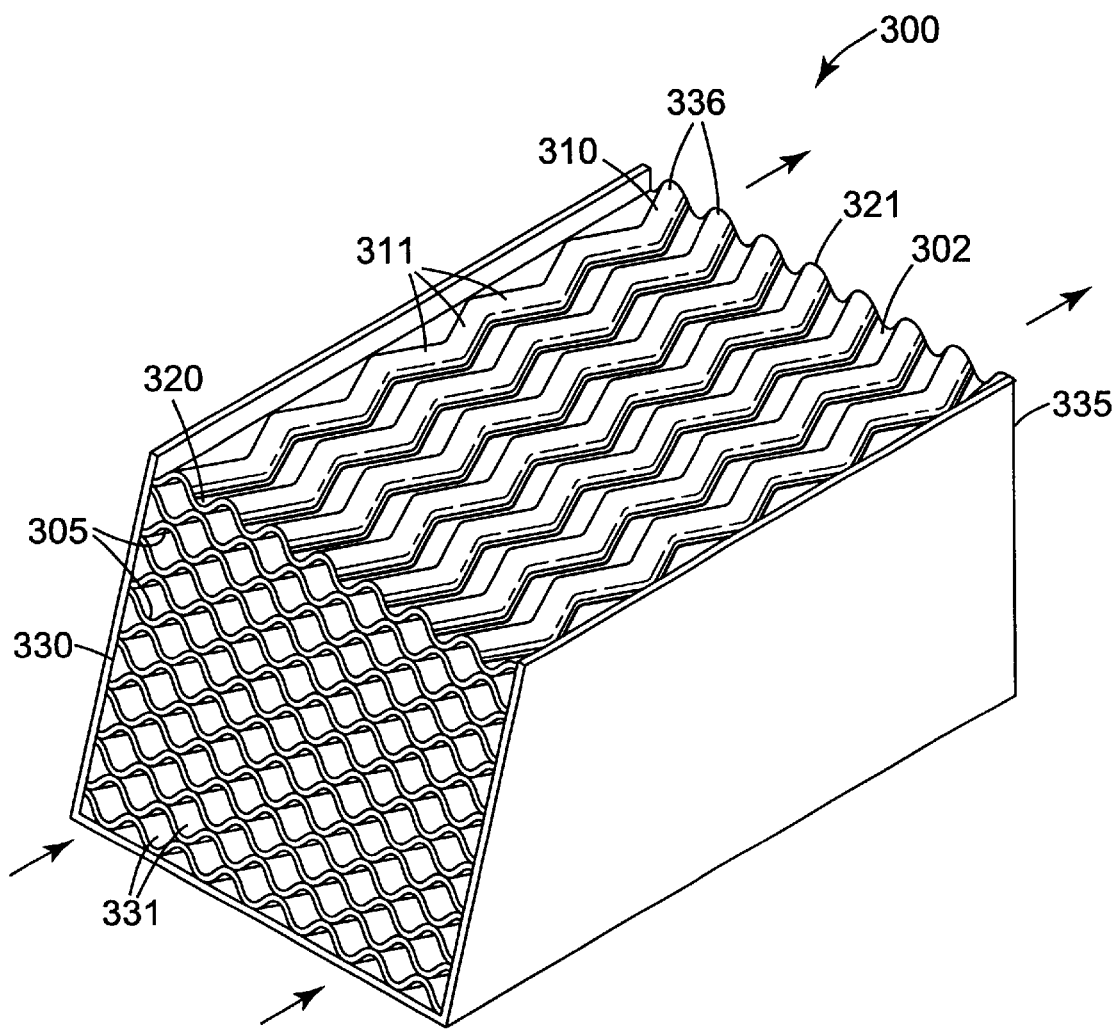
FIG. 3 is a perspective view of an alternate stacked filter formed from multiple layers of an alternate filter web in accordance with the present invention.

In FIG. 3, an alternate embodiment of a channel flow or stacked filter 300 is shown formed from multiple layers 305 of channel pattern filter web 302. The channel pattern filter web 302 includes a plurality of zig-zag shaped channels 310 formed from short linear channel segments 311 fluidly connected at angles to one another. Each filter layer 305 has two undulating edges 320, 321 formed at each end of the plurality of channels 310 by the creation of the parallel zig-zag channels 310, similar to the undulating channels 110 described above.

A first face 330 includes a plurality of inlets 331 and a second face 335 formed on the opposite side of the stacked filter 300 includes a plurality of outlets 336. In this embodiment, the first face 330 is formed at an angle relative to the second face 335 creating non-parallel inlet and outlet faces. The angled first face 330 can be formed during stacking of the layers 305 or the stacked filter 300 can be cut to the desired shape. It is to be understood that variations in face configurations, including but not limited to parallel, non-parallel, angled relative to filter layers, and perpendicular to filter layers, are within the scope and spirit of the present invention. Additionally, one or more of the faces can have two or more facets, or can be non-planar (e.g., sinusoidal). Optionally, the stacked filter 300 could be formed, molded or pleated to cause undulations of the filter layers 305 from the first face 330 toward the second face 335, thereby adding an additional dimension of perturbation in the filter 300. In addition, the various configurations shown or described in the illustrated embodiments may all be combined to form numerous structures that are also within the scope and spirit of the present invention.

As with the undulating channel flow filter 200 described above, the fluid passes into the inlets 331 and travels along the plurality of zig-zag channels 310 until it exits the stacked filter 300 at the outlets 336. the zig-zag shape of the channels 310 induces similar fluid flow as that of the undulating channels 110 due to the circuitous route the fluid travels in passing through the filter 300.

Numerous channel shape configurations that produce continuous, non-straight and/or tortuous channels through the depth of the stacked filter of channel pattern filter web layers are possible. Such tortuous channels may form a regular or irregular pattern and may be symmetrical or asymmetrical across the major surface of the filter web. Additionally, the tortuous patterns on each layer may be the same, or may vary from layer-to-layer. It is to be understood that all such configurations are within the spirit and scope of the present invention.

Figure 4:
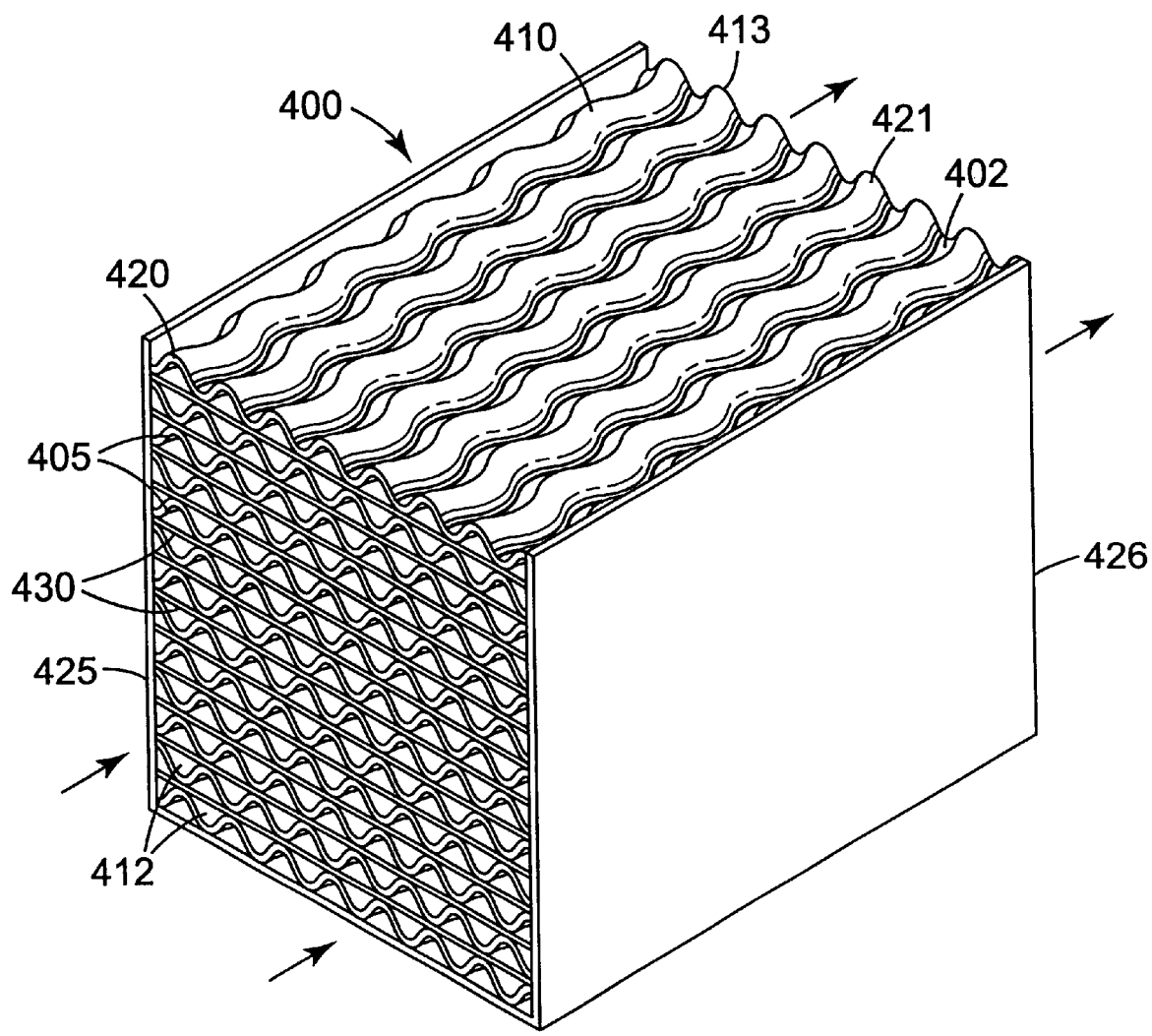
FIG. 4 is a perspective view of a stacked filter formed from multiple layers of a channel pattern filter web with planar web layers interposed between channel pattern web layers in accordance with the present invention.

In FIG. 4, another embodiment of a stacked filter 400 is shown formed from multiple layers 405 of channel pattern filter web 402 having undulating channels 410 and undulating edges 420, 421. Any of the channel patterns disclosed herein may be used with the embodiment of FIG. 4. In this embodiment, instead of offsetting adjacent layers 405 in order to minimize nesting of the channel pattern layers 405, additional flat web layers 430 are interposed between the channel pattern layers 405. The web layers 430 may be constructed of a filter medium, a porous reinforcing material such as a scrim or screen, or a non-porous material such as a film or paper. As a result, each channel pattern layer 405 is bounded by a flat layer 430 producing a first face 425 of generally half-sized inlets 412 and a second face 426 formed on the opposite side of the stacked filter 400 of generally half-sized outlets 413 (as compared to the inlets 212 and outlets 215 of the embodiment shown in FIG. 2). Depending upon the construction of the flat layer 430, there may be some fluid communication between adjacent channel pattern layers 405. Although the size of each inlet 412 and outlet 413 is about half, the number of inlets 412 and outlets 413 may be about double (depending on the thickness of each web layer), thereby maintaining an equivalent fluid flow through stacked filter 400 and thus producing equivalent efficiency and pressure-drop results. Without the problem of nesting, the channel pattern layers 405 may be aligned as desired, producing infinite variations in inlet and outlet patterning on the faces 425, 426 of the filter 400.

Figure 5:
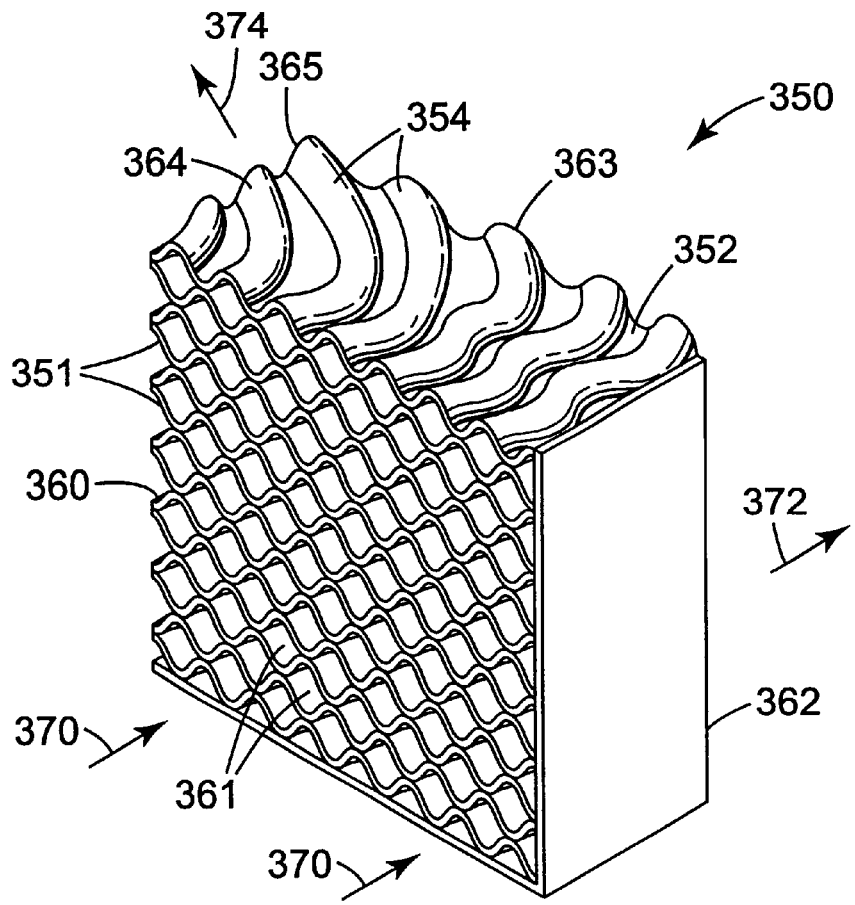
FIG. 5 is a perspective view of a stacked filter formed from multiple layers of another alternate filter web in accordance with the present invention.

In FIG. 5, yet another embodiment of a stacked filter 350 in accordance with the present invention is shown formed from multiple layers 351 of channel pattern filter web 352. A plurality of undulating channels 354 are formed across the filter web 352, but instead of the channels 354 proceeding only from a first face 360 to an opposite second face 362 as in the previously described embodiments, at least a portion of the plurality of channels 354 are angled. As a result, a plurality of inlets 361 are formed on the first face 360 with a plurality of outlets 363 formed on the opposite second face 362, and additionally, a portion of the channels 354 produce a plurality of outlets 365 formed on a third face 364 that is at an angle relative to and adjacent to both the first and second faces 360, 362. The perimeter of the stacked filter 350 can be square, rectangular, a parallelogram or a variety of regular and/or irregular shapes. When the primary fluid flow, depicted by arrows 370, enters the inlets 361, the fluid proceeds along the plurality of channels 354 and a portion of the fluid exits the stacked filter 350 at outlets 363 (shown by arrow 372) and a portion exits the filter 350 at outlets 365 (shown by arrow 374). It is to be understood, however, that the terms "inlet" and "outlet" are interchangeable throughout the present application such that, in this embodiment, the primary fluid flow could enter the filter 350 at perpendicular faces 364 and 362, and exit at face 360.

Numerous configurations of channel patterns and layouts are possible to produce channel flow filters with various inlet and outlet positions. It is to be understood that all such configurations are within the spirit and scope of the present invention.

The adsorbent nature of the stacked filter embodiments described above is due in part to the filter web material used to produce the channel pattern filter web layers. In one embodiment, the filter web material is a particulate loaded blown microfiber (BMF) web using a sorbent particulate material. For many years non-woven fibrous filter webs have been made from polypropylene using melt-blowing apparatus of the type described in Van A. Wente, "Superfine Thermoplastic Fibers," *Industrial Engineering Chemistry*, vol. 48, pp. 1342–1346 and in Report No. 4364 of the Naval Research Laboratories, published May 25, 1954, entitled "Manufacture of Super Fine Organic Fibers" by Van A. Wente et al. Melt-blown microfiber webs continue to be in widespread use in filtering particulate contaminants and vapor sorption.

Sorbent particulate material such as, but not limited to, activated carbon, silica, zeolite or alumina may be included in the web for sorbing organic vapors in filtration applications. Such particles may be present in amounts up to about 80 volume percent of the contents of the web. Such particle-loaded webs are described, for example, in U.S. Pat. No. 3,971,373 (Braun), U.S. Pat. No. 4,100,324 (Anderson) and U.S. Pat. No. 4,429,001 (Kolpin et al.).

Figure 6:
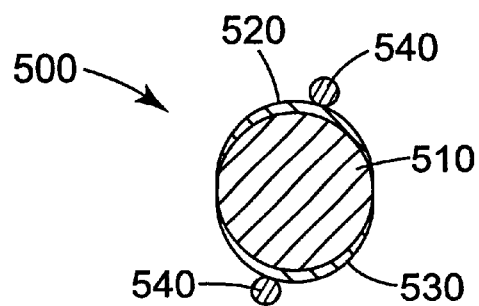
FIG. 6 is a cross-sectional view of a multi-layer blown microfiber strand in accordance with the present invention.

In FIG. 6, a cross-section of a multi-layer fiber strand 500 of BMF is shown with a center core 510 of polymeric material, an upper layer 520 and a lower layer 530, both of adhesive. Such multi-layer fiber strands 500 may be formed into a non-woven filter web (not shown) by known methods, as described, for example, in U.S. Pat. No. 5,238,733 (Joseph et al.). Particulate matter 540 subsequently applied to the web adheres to the adhesive layers 520, 530 of the individual fiber strands 500 providing a bond that results in high retention of the particulate matter 540 within the filter web, even when the web is handled or formed. Particle loading of similar non-woven filter webs is described, for example, in PCT International Publ. No. WO 99/28542 (Springett et al.).

In one embodiment, the filter web material was formed from a three-layer BMF including a core of polypropylene (75% of total weight) and top and bottom layers of propylene-hexene copolymer adhesive (25% of total weight). The BMF web was loaded with Calgon 80×325 mesh carbon (80% by weight) resulting in an overall web basis weight of 250 grams/meter$^2$.

Figure 7:
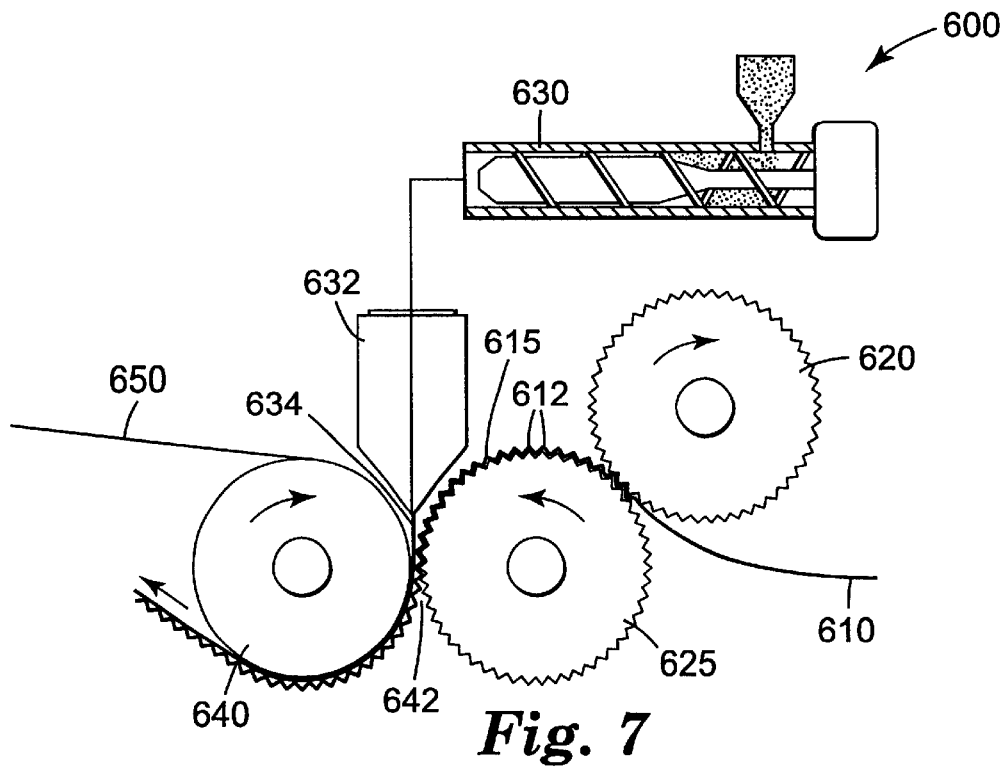
FIG. 7 is a schematic illustration of a process for forming embossed filter webs in accordance with the present invention.

Formation of the channels in the filter web may be achieved by many methods known to one skilled in the art. In FIG. 7, a schematic illustration of an embossing apparatus 600 is shown into which a web 610, such as a particulate loaded filter web, is input. Two mating embossing rollers 620, 625 impress the desired channel structure 612 into the web 610 to produce an embossed channel pattern web 615. For some types of webs 610, heating of the embossing rollers 620, 625 will cause the embossed channel structure 612 to be retained in the embossed web 615 without further support.

For other types of webs 610 or if the rollers 620, 625 are not heated, additional support structure may be required for the embossed web 615 to retain the embossed channel structure 612. One example of a support structure is provided by an extruder 630 producing a molten polymer fed through a die 632 to form strands 634 applied as a backing to the embossed web 615 at a nip 642 formed between a smooth roller 640 and the embossing roller 625. Optionally, a backing web 650, such as a spun-bond backing, may be applied at nip 642 on the side of the strands 634 opposite the embossed web 615. The backing web 650 is then adhered to the embossed filter web 615 by the molten polymer strands 634. Once the embossed web 615 is formed, with or without additional support structure, the web 615 may be slit to a desired width and/or cut into desired length sheets to form the stackable layers of a stacked filter, as described above.

In another embodiment, a pair of metal plates (not shown), upon which a plurality of undulating parallel wires are attached, may be matingly positioned above and below a filter web. When pressure and heat are applied to the two plates, the wires enmesh to produce the plurality of undulating channels and the undulating edge. Referring again to FIG. 2, in one embodiment, the wire diameter of the plate wires may be in the range of about 0.1 centimeters to about 1.0 centimeters (about 0.039 to about 0.39 inches), and was tested in the range of about 0.24 centimeters to about 0.41 centimeters (about 0.09 inches to about 0.16 inches). These tested wires produce an edge wavelength 122 in the range of about 0.8 to about 0.9 centimeters (about 0.31 to about 0.35 inches) and the edge amplitude 124 in the range of about 0.3 to 0.6 centimeters (about 0.12 to about 0.24 inches), however the edge wavelength and amplitude may vary depending on the channel configuration. In one embodiment, the undulations of the wires produced a plurality of channels 110 having a wavelength 112 in the range of about 1.26 centimeters to about 2.0 centimeters (about 0.5 to about 0.79 inches), however a range of about 0.5 centimeters (about 0.20 inches) to about four times the depth 223 of the filter 200 is contemplated, but may vary. The amplitude 114 of the channels 110 was tested in the range of about 0.4 centimeters to about 0.55 centimeters (about 0.16 to about 0.22 inches), however a range of about 0.1 centimeters to about 1.0 centimeters (about 0.039 to about 0.39 inches) is contemplated, but may vary.

Figure 8:
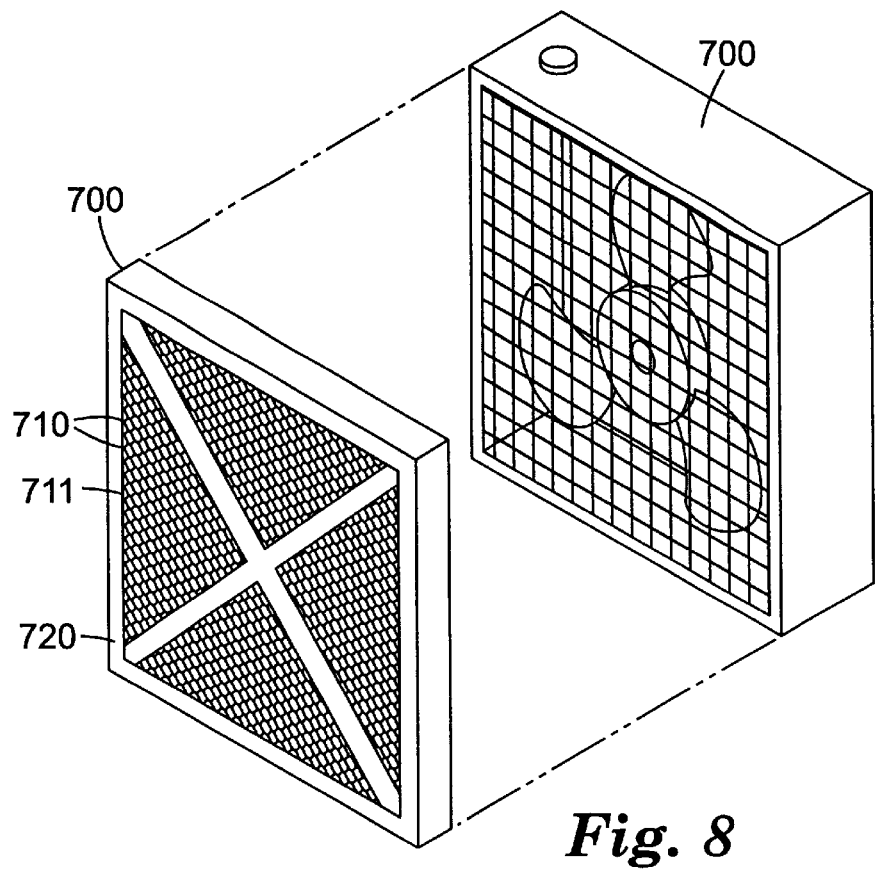
FIG. 8 is a perspective view of a fan filter and fan combination in accordance with the present invention.

The stacked filter of the present invention is useable both in passive fluid flow and active fluid flow applications. In FIG. 8, an example of an active fluid flow application is shown. A stacked filter 700 formed from channel pattern layers 710 of filter web 711 is shown built to a desirable size either as an individual stack or a combination of adjacent multiple stacks. A frame 720 surrounds the stacked embossed layers 710 to hold the stacked configuration together during handling and use of the filter 700. The filter 700 is used in conjunction with a standard fan 750 designed to either blow air through the filter 700 or draw air into the filter 700, whichever is most desirable for the specific application. Such a filter 700 and fan 750 combination may be used, for example, in order to remove undesirable odors and vapors from an area, such as a freshly painted room, as a furnace filter, or other suitable application.

In an example of a passive fluid flow application, a channel flow barrel filter is formed from a plurality of stacked filter layers upon which a plurality of undulating channels were formed therein. (See Example 4.) The depth of the filter is limited to a portion of the height of the barrel into which the channel flow filter is to be inserted to allow fluid flow around the bottom face of the barrel filter. The side edges of the filter, that is those edges along the length of the channels, are brought together to form a cylindrical sleeve configuration that may be placed around the inside perimeter of the barrel. Alternately, the stacked channel flow filter may be formed by wrapping a filter web, having the channel pattern formed therein, around a form to produce the multiple layers of the stacked filter.

In the above described configuration, the channels run from the top toward the bottom of the barrel. When solvent loaded materials, such as cleaning rags, are placed in the filter lined barrel and the barrel is closed, the solvent vapors are believed to flow up through the channels by convection. The channel flow filter provides substantial adsorption of the solvent vapors present in the barrel, thereby substantially reducing the solvent vapor released from the barrel when the barrel is opened, as well as keeping concentrations of typical solvent vapors at safer levels during storage. Thus, potential safety and health hazards are reduced to acceptable limits for materials loaded with typical cleaning solvents.

The stacked filter of the present invention uses multiple layers of filter material that are formed with a multi-dimensional non-straight or tortuous channel pattern to produce a high efficiency and low pressure drop filter, such as for vapor and odor removal from a fluid. Within the scope of the present invention, high efficiency is defined to be an efficiency preferably greater than 50 percent, and more preferably between about 50 percent and 70 percent, but may be even higher. Similarly, a low pressure drop is defined to be preferably in the range of about 0.6 to about 2.2 millimeters H20, but it could be even less.

Although the above illustrated embodiments describe the use of the stacked channel flow filter medium of the present invention for the removal of vapor and odor, the use of such filter is also contemplated for the removal of particles from a fluid. It is believed that the structure of the stacked layers having a plurality of tortuous channels formed therein would provide enhanced particle removal, especially when combined with the use of charged filter web material. In addition, it is believed that the channel flow filters of the present invention would be useful for the enhanced removal of matter, such as aqueous and biological aerosols, particularly for use in home, medical and military applications. In addition, it is to be understood that the channel flow filter of the present invention may also be used in combination with other filters, such as a non-woven face covering, a pleated filter or other suitable filter material, to form integral filtering units, such as a hybrid filter capable of efficient removal of both particles and vapors/odors for specific applications.

The stacked filter of the present invention uses multiple layers of filter material, at least one of which is formed to include a plurality of continuous, non-straight or tortuous channels formed across the surface of the layer, each having a radiused, or other shape, cross-section. The formation of the channels produces edges at both ends of the channels that correspond in shape to the cross-section of each channel, producing a regular or irregular undulating shape. When the filter layers are stacked, the layers are positioned so as to produce a first face including a plurality of inlets and at least a second face including a plurality of outlets.

A fluid passes into the filter through the plurality of inlets, travels through corresponding disruptive fluid pathways formed by the undulating channels and then passes out of the filter through the outlets. It is believed that adsorption of the undesired elements in the fluid occurs primarily by lateral diffusion as the fluid passes along the channels, but also as the fluid passes into the filter layers due to perturbation of the fluid stream within the channels caused by the shape of the channels. In addition, the shape of the channels causes additional adsorption to occur due to turbulence and increased mixing of the fluid within the channels. Such additional adsorption helps produce a higher and longer term of efficiency for the stacked filter of the present invention than other adsorption filters. In addition, the stacked structure and multiple channel formation of the stacked filter results in a low pressure drop in the fluid as it passes through the filter. By manipulation of the filter structure, filters with an efficiency similar to a conventional filter, but a much lower pressure drop may be constructed for a particular application. Additionally, filters with a pressure drop similar to a conventional filters, but with a much higher efficiency may also be constructed for a particular application. As is apparent, the stacked filter of the present invention provides versatility in filter design for particular applications, in addition to the other benefits.

TEST PROCEDURES

A test method used for determining pressure drop, within the scope of the present invention, was to pass 170 liters/minute of gas, preferably cyclohexane or n-butane, through a stacked channel flow filter having a 6 centimeters by 6 centimeters square face and a depth of 5.1 centimeters with a 0.8 meter/second face velocity. The pressures before and after the gas passed through the filter were then recorded, and the difference between the two was determined.

EXAMPLES

Example 1

Carbon Loaded BMF: Sinusoidal Channel Construction.

Embossing plates with the patterns listed below were made by mounting sinusoidally bent wire strips onto an aluminum plate. The spacing was such that the top and bottom plates nested together and produced a uniform channel pattern in a web embossed between them. Several of these wires were bent at a time between two plates that had machine bolts epoxied down in parallel, at spacings corresponding to the "wavelength" desired. Different gauge wires ("steel, aluminum and copper") were used to produce different channel diameters. "Amplitude" of the wavy channel was a function of the bolt diameter and spacing on the bending plate, wire gauge, and force on the ram.

The embossing plates had the following dimensions:

| Pattern # | Wavelength | Amplitude | Wire Diameter | Descriptor |
|---|---|---|---|---|
| 1 | 2 cm* | 0.55 cm | 0.244 cm | High amplitude steel |
| 2 | 2 cm | 0.40 cm | 0.244 cm | Low amplitude steel |
| 3 | 1.26 cm | 0.40 cm | 0.3175cm | Low amplitude aluminum |
| 4 | 2 cm | 0.40 cm | 0.406 cm | Low amplitude copper |

*centimeters (cm)

Carbon loaded web was made containing about 80% by weight Calgon 80×325 mesh carbon and about 20% by weight blown micro-fiber (about 8–12 micron effective fiber diameter). The fiber strand had three layers: a center layer of polypropylene (about 75% of the total weight) and top and bottom layers of propylene-hexene copolymer adhesive (about 25% of the total weight). The basis weight of the carbon loaded web was about 250 grams/square meter. (The procedure for making this web is described in Springett et al.) Webs were pressed between the embossing plates for about 30 seconds at 70 degrees C. in about a 30.5 centimeters×30.5 centimeters (12 inch×12 inch) hydraulic press at about 17,792 Newtons (about 4000 pounds). These embossed webs were cut by a ruling die into about 6 cm×5.1 cm segments with the sinusoidal channels aligned perpendicular to the about 6 cm edge. Segments were stacked loosely, with channels aligned in parallel, to form a stack about 6 cm high. This stack was mounted in a cardboard frame to make a channel flow filter with about a 6 cm×6 cm cross-section (channel openings at entrance and exit), and a sample thickness (in the flow direction) of about 5.1 cm. A bead of hot melt adhesive was applied around the perimeter of the filter to bind the layers to the frame and prevent bypass.

Channel flow samples were compared to an internal standard pleated control. To make the control, 40×140 mesh Kuraray coconut carbon was heat fused to a polyester scrim using powdered polyurethane as a binder. A layer of Minnesota Mining and Manufacturing Company's (3M) Filtrete GSB 30 blown micro-fiber particle capture medium was fused to the carbon layer on the side opposite the scrim. This material was pleated to a depth of about 4.4 cm, with about a 1 cm pleat-to-pleat spacing and was cut about 6 cm wide. A cardboard frame was glued around the sample to make about a 6 cm×6 cm cross-section and about a 4.4 cm thick sample having approximately 9.3 grams carbon per sample. Flow was through the web, in contrast to flow parallel to the web in the channel flow filters.

Both pressure drop and adsorption efficiency were tested at about 170 liters/minute with a face velocity of about 0.8 meters/second, using 3M Filtration Products' large duct flow test system for pressure drop, and a standard gas adsorption test setup for adsorption efficiency. A standard challenge of about 20 parts/million (ppm) n-butane was used.

Pressure drops at about 170 liters/min, as shown in Table 1, ranged from about 0.64 to about 2.26 millimeters (mm) $H_2O$. Control samples averaged about 2.2 millimeters $H_2O$. (The pressure drop of a single flat layer of Minnesota Mining and Manufacturing Brand Filtrete/scrim combination was measured to be about 1.41 millimeters $H_2O$ at this flow rate; thus, for a direct comparison with the pleated control, a value of about 1.41 millimeters $H_2O$ or less should be added to the pressure drop readings, because a layer of Filtrete or scrim was not included.)

TABLE 1

Pressure Drops

| Web weight (g/m²) | Embossing Specification | | | Filter Specification | | | 5 m³/hr ΔP (mm H₂O) | 10** m³/hr ΔP (mm H₂O) | 15 m³/hr ΔP (mm H₂O) | 20 m³/hr ΔP (mm H₂O) | 50 m³/hr ΔP (mm H₂O) |
|---|---|---|---|---|---|---|---|---|---|---|---|
| | Wire type/dia. (cm) | Amplitude (mm) | λ (cm) | Thickness (in.) | Total weight* (g) | # Layers | | | | | |
| Samples tested with 20 ppm n-butane at 170 lpm | | | | | | | | | | | |
| 250 | steel/0.244 | 5.5 | 2.0 | 2 | 18.067 | 23 | 1.26 | 2.26 | 3.67 | 4.95 | 24.09 |
| 250 | steel/0.244 | 4.0 | 2.0 | 2 | 18.343 | 23 | 1.00 | 1.56 | 2.54 | 3.40 | 14.79 |
| 250 | Al/0.3175 | 3.5 | 1.3 | 2 | 16.090 | 20 | 0.83 | 1.50 | 2.46 | 3.35 | 16.29 |
| 250 | Cu/0.406 | 4.0 | 2.0 | 2 | 12.310 | 15 | 0.37 | 0.64 | 1.09 | 1.53 | 6.49 |
| Pleated control, GSB 30/1/400, 9.3 g | | | | | | | 1.39 | 2.18 | 3.37 | 4.44 | 13.09 |
| Scrim and Filtrete | | | | | | | | | | | |
| Scrim | | | | | | | 0.68 | 1.03 | 1.6 | 2.01 | 7.14 |
| TPX 30 Filtrete | | | | | | | 1.38 | 2.17 | 3.16 | 4.17 | 13.39 |
| GSB-30 Filtrete | | | | | | | 0.74 | 1.23 | 1.73 | 2.47 | 7.92 |
| GCB-47, Filtrete 30 g/m², scrim 17 g/m² | | | | | | | 0.80 | 1.31 | 1.92 | 2.58 | 8.89 |
| GCB-77, Filtrete 60 g/m², scrim 17 g/m² | | | | | | | 1.42 | 2.23 | 3.30 | 4.42 | 16.99 |

Figure 9:
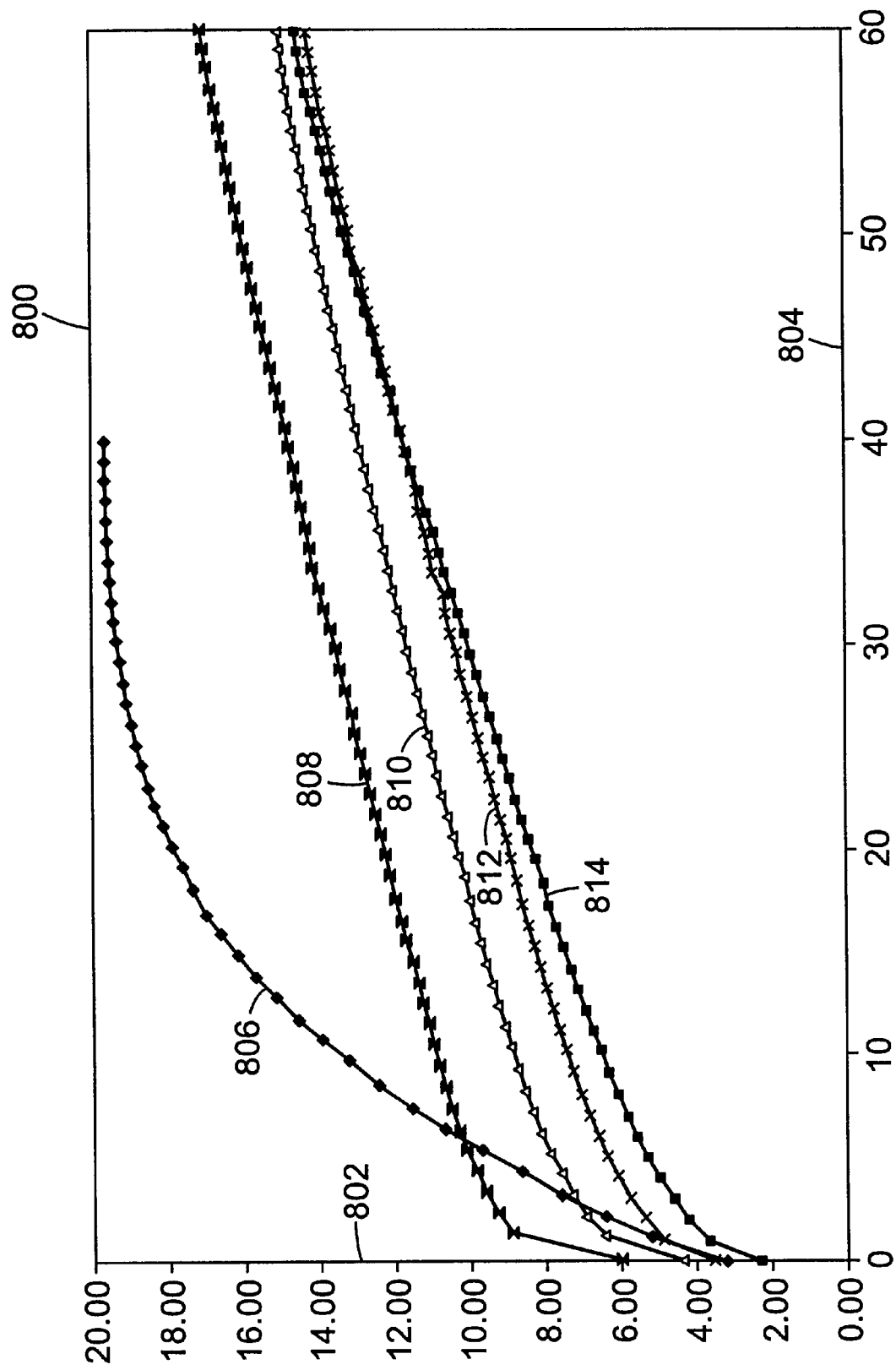
FIG. 9 is a plot of vapor concentrations versus time for a number of different channel flow filter test samples having different channel configurations.

*total weight of carbon (80%) + binder (20%)
**10 m³/hr is equivalent to 170 lpm The n-Butane concentration (Miran IR detector) readings exiting the samples were converted to adsorption efficiencies ((challenge concentration—exit concentration)/challenge concentration). In FIG. 9, a plot 800 shows the exit concentrations in ppm (along axis 802) plotted as a function of time in minutes (along axis 804), for samples made from the four different sinusoidal patterns listed above. Curve 814 was a pattern #1 having a pressure drop of about 2.26 millimeters H₂O; curve 812 was a pattern #2 having a pressure drop of about 1.56 millimeters H₂O; curve 810 was a pattern #3 having a pressure drop of about 1.51 millimeters H₂O; curve 808 was a pattern #4 having a pressure drop of about 0.64 millimeters H₂O; and curve 806 was the pleated control having a pressure drop of about 2.20 millimeters H₂O.

Figure 10:
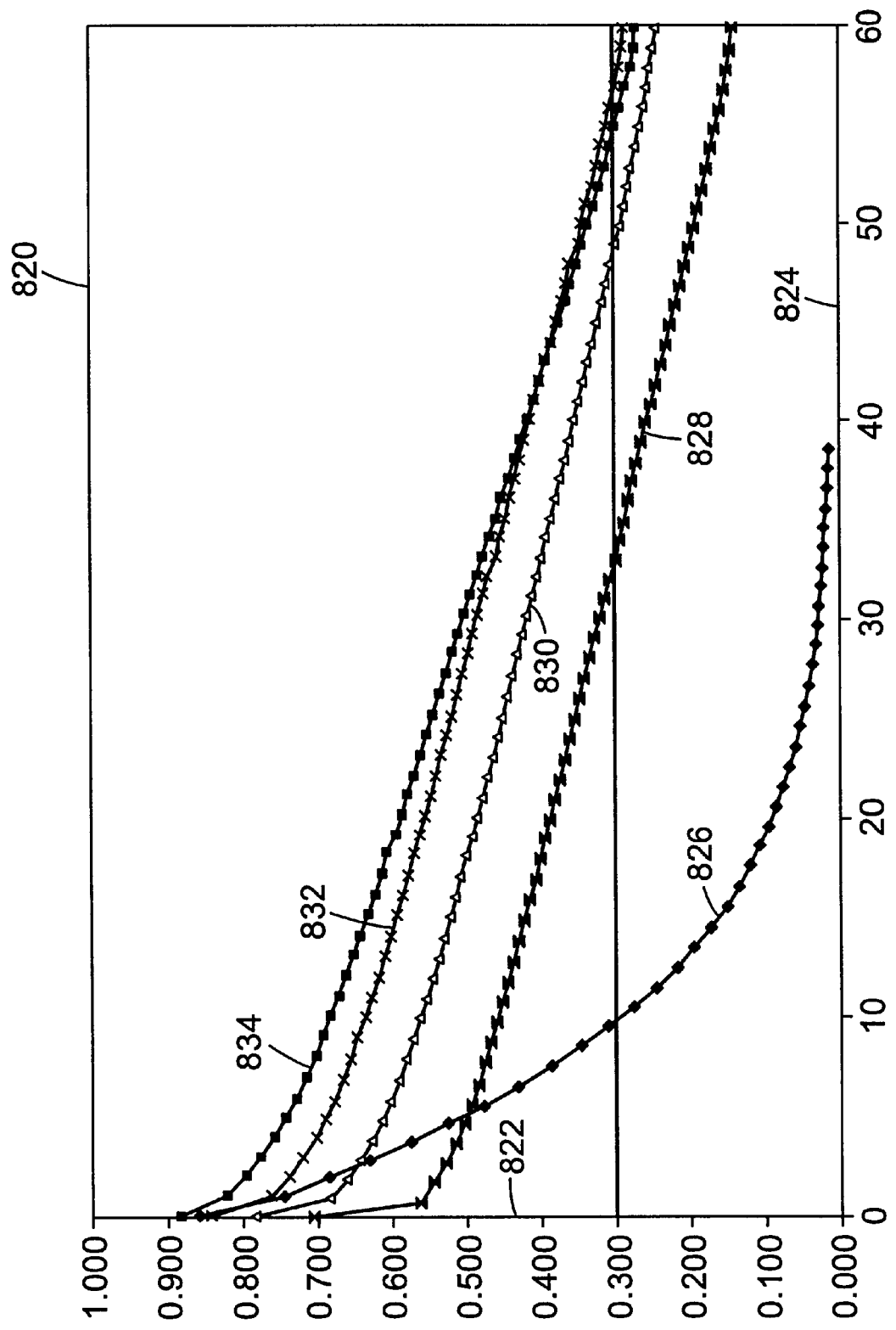
FIG. 10 is a plot of adsorption efficiency versus time for the test samples shown in FIG. 9.

In FIG. 10, a plot 820 shows the adsorption efficiencies (along axis 822) plotted as a function of time in minutes (along axis 824), also for samples made from the four different sinusoidal patterns listed above. Curve 834 was a pattern #1 having a pressure drop of about 2.26 millimeters H₂O; curve 832 was a pattern #2 having a pressure drop of about 1.56 millimeters H₂O; curve 830 was a pattern #3 having a pressure drop of about 1.51 millimeters H₂O; curve 828 was a pattern #4 having a pressure drop of about 0.64 millimeters H₂O; and curve 826 was the pleated control having a pressure drop of about 2.30 millimeters H₂O. At this challenge, the channel flow structure appears to retain a higher efficiency for longer than the control. This is attributed to the fact that the samples contain more carbon than the control, and most likely expose it more to the gas stream (finely divided carbon primarily at the surface).

The areas under the efficiency curves were integrated down to an efficiency of about 30%. The efficiency-time products, shown in Table 2, for the channel flow structures are higher than the controls.

TABLE 2

Areas Under Efficiency/Time Curves

| Sample | Area under curve down to 30% Efficiency (Eff.) (min.) | Δp at 170 lpm (mm H₂O) |
|---|---|---|
| Pleated control, GSB 30/1/400, 9.3 g | 2.36 | 2.30 |
| Sinusoidal channels, 250 g/m² | | |
| Steel, high amplitude (Pattern #1) | 12.67 | 2.26 |
| Steel, low amplitude (Pattern #2) | 11.50 | 1.56 |
| Aluminum (Pattern #3) | 8.01 | 1.50 |
| Copper (open structure) (Pattern #4) | 3.88 | 0.64 |
| Aluminum (straight channels), 250 g/m² | | |
| 0* | 2.24 | 0.70 |
| 10* | 5.25 | 0.91 |
| 25* | 5.31 | 1.15 |
| 45* | 9.19 | 2.13 |
| High carbon loading (sinusoidal channels) | | |
| Steel, high amplitude, 640* g/m², light (#1) | >14.30 | 2.33 |
| Aluminum, 640* g/m², light (#3) | >7.50 | 1.80 |
| Aluminum, 640* g/m², hard (#3) | >9.24 | 1.76 |
| Aluminum, 320 g/m², light (#3) | 7.17 | 0.99 |
| Copper, 640* g/m², light (#4) | 4.05 | 0.88 |

Figure 11:
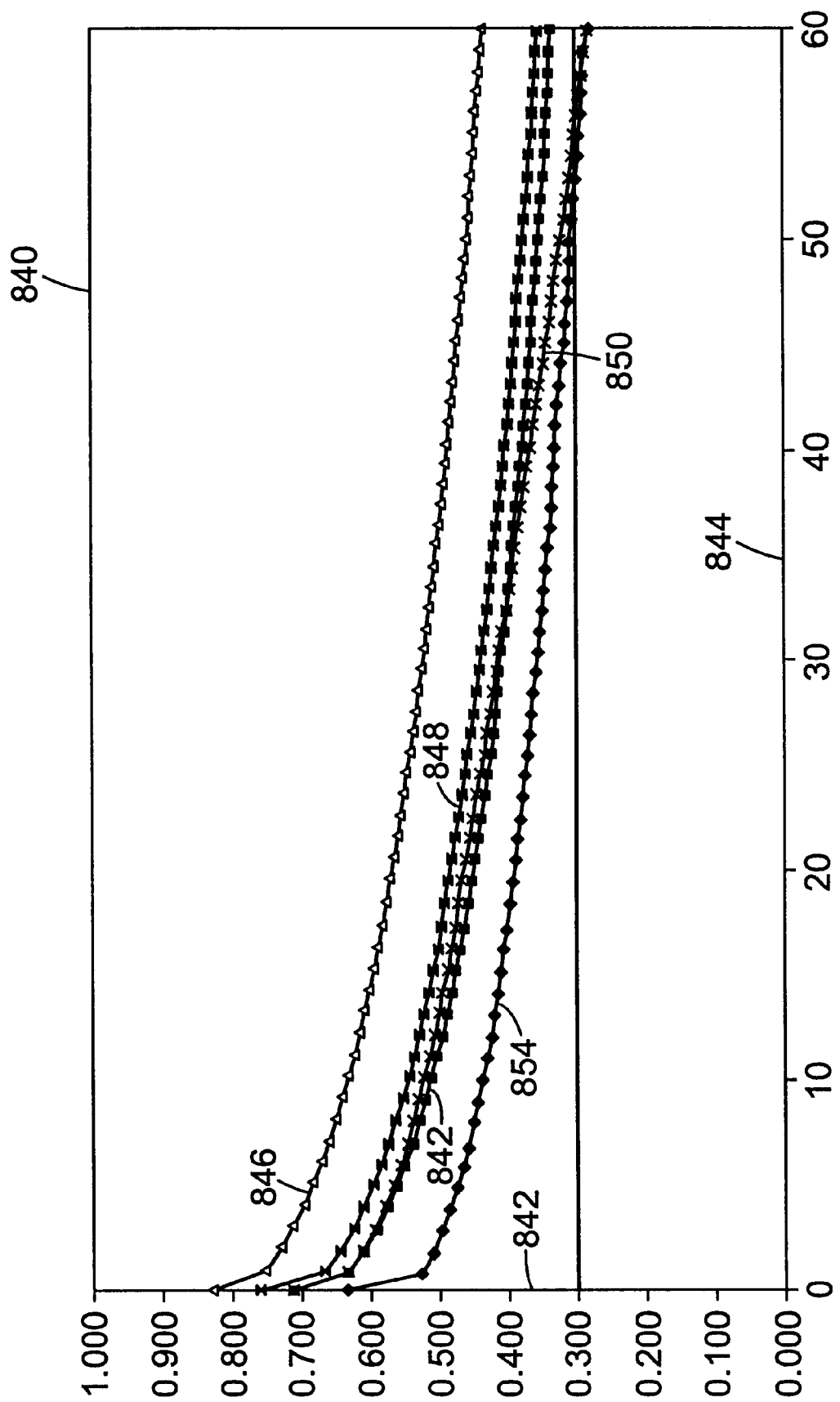
FIG. 11 is a plot of adsorption efficiency versus time for a number of different channel flow filter test samples having different filter configurations.

*two layers 320 g/m² compressed before being embossed
light = light compression
hard = heavy compression The next experiment was to increase carbon loading by compressing some of the higher basis weight samples prior to pattern embossing. Thus samples were made with two layers having about 320 grams/meter² (g/m²) basis weight web per layer, compressed between two flat plates before embossing. In FIG. 11, a plot 840 shows the adsorption efficiencies (along axis 842) plotted as a function of time in minutes (along axis 844) for various samples. Curve 846 was a pattern #1 formed from about 640 grams/meter² base weight web with light compression having a pressure drop of about 2.45 millimeters H₂O; curve 848 was a pattern #3 formed from about 640 grams/meter² base weight web with heavy compression having a pressure drop of about 1.88 millimeters H₂O; curve 850 was a pattern #3 formed from about 320 grams/meter² base weight web with light compression having a pressure drop of about 1.11 millimeters H₂O; curve 852 was a pattern #3 formed from about 640 grams/meter² base weight web with light compression having a pressure drop of about 1.92 millimeters H₂O; and curve 854 was a pattern #4 formed from about 640 grams/meter² base weight web with light compression having a pressure drop of about 1.00 millimeters H₂O. As can be seen from FIG. 11, efficiency for these structures starts off slightly lower than the previous more lightly loaded (and uncompressed) samples shown in FIG. 10, but retains higher efficiency for considerably longer time after that. After sixty minutes, only the most open "copper" structure, curve 854, had reached about 30% efficiency.

Figure 12:
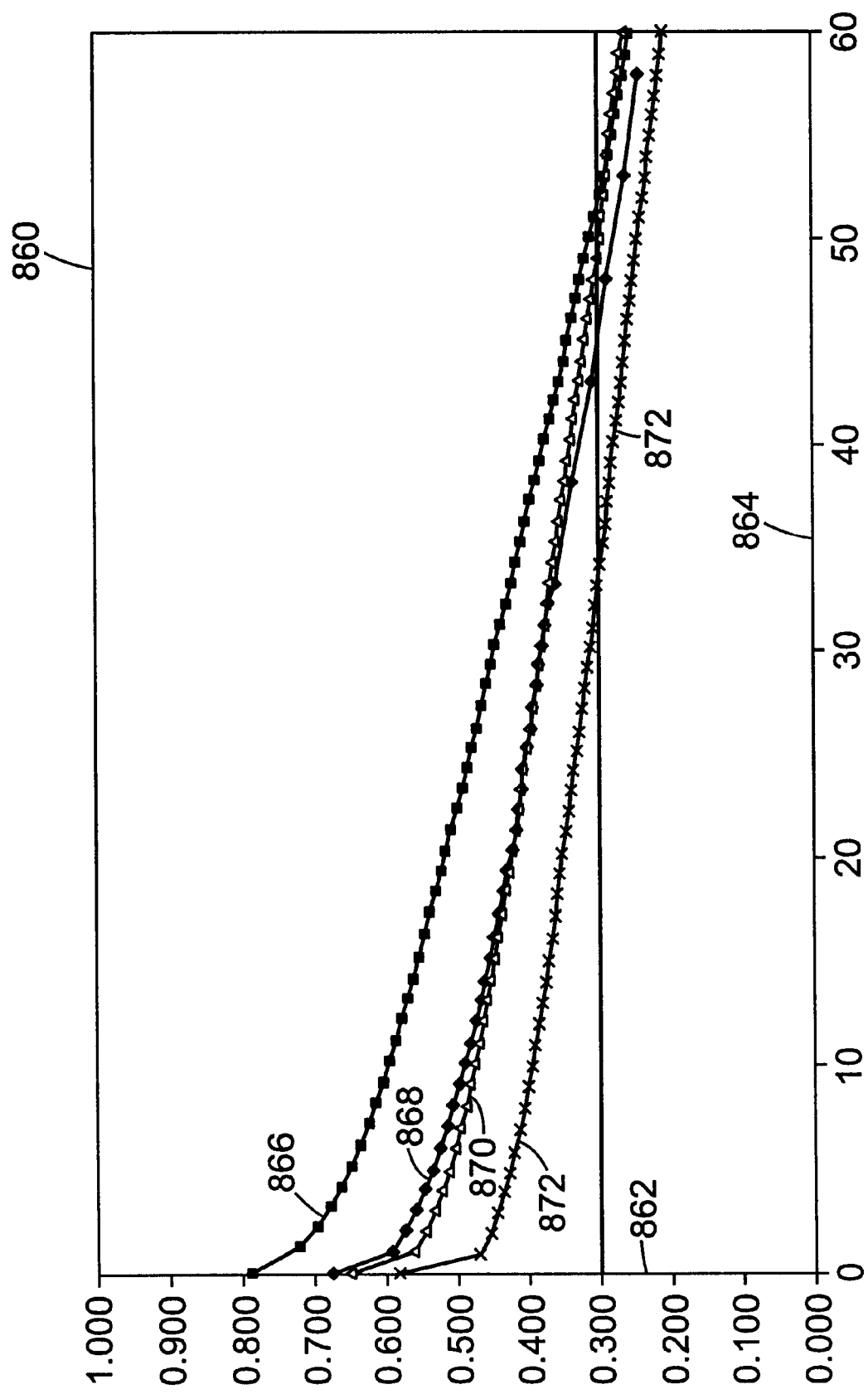
FIG. 12 is a plot of adsorption efficiency versus time for a number of straight channel filter test samples wherein the channels were formed at different angles.

By way of contrasting sinusoidal with straight channels angled with respect to the direction of flow, plates were made with straight channels of the aluminum wire (about 0.3175 centimeters diameter), as used in pattern #3. The material was embossed at angles of about 0, 10, 25 and 45 degrees to the direction of flow. Efficiency curves for these samples made with layers of about 250 grams/meter² basis weight web, having the same composition described above, are shown in FIG. 12. In FIG. 12, a plot 860 shows the adsorption efficiencies (along axis 862) plotted as a function of time in minutes (along axis 864) for the various samples. Curve 866 was an embossed angle of about 45 degrees having a pressure drop of about 2.25 millimeters H₂O; curve 868 was an embossed angle of about 25 degrees having a pressure drop of about 1.27 millimeters H₂O; curve 870 was an embossed angle of about 10 degrees having a pressure drop of about 1.03 millimeters H₂O; and curve 872 was an embossed angle of 0 degrees having a pressure drop of about 0.82 millimeters H₂O.

Example 2
Performance Comparison of Sinusoidal and Straight Channel Filters.

Adsorption efficiencies and pressure drops were compared for edge filters with sinusoidal channels and with straight channels of the same diameter. One set of filters was made from stacked layers embossed with the high amplitude sinusoidal pattern #1, as listed above in Example 1 (embossing plates: about 0.244 centimeters diameter (steel) wires, amplitude: about 0.55 cm; and wavelength: about 2 cm; row spacing: about 0.80 centimeters (plates nest)). A second set was made from stacked layers embossed with straight channels having the same diameter and channel to channel spacing.

For this experiment, each layer was a composite of embossed carbon loaded web (about 300 grams/meter², about 80% carbon loading, composition described earlier) bonded to a flat sheet of paper. This was done to get a pure channel pattern and prevent nesting of the layers. The web was left in the plate after embossing, and a flat sheet of computer paper was bonded to it with Minnesota Mining and Manufacturing Company Spray Bond hot melt adhesive (#6111) before removing. Layers of this corrugate were stacked about 18 deep (about 5.1 centimeters high), with Spray Bond between layers, and cross-cut with a serrated edge band saw to produce filters about 4.8 centimeters thick (flow direction), about 15 centimeters long and about 5.1 centimeters high (59–62 g combined weight, or approximately about 40 grams carbon each). Filters were weighed, and mounted in cardboard frames.

Single pass adsorption efficiencies were measured using cyclohexane as a test gas. Concentrations entering and exiting the filter were monitored with a B&K photo-acoustic IR detector, sampling through ports in the wall of the sample flow chamber. Adsorption efficiency is calculated as:

Efficiency=(entrance concentration−exit concentration)/(entrance concentration)

Filters were taped to a slide that fit tightly into the center of a flow-through sample chamber (about 7 centimeters× about 20 centimeters cross-section, about 33 centimeters length), and sealed so that all flow was through the sample. Cyclohexane/air challenge mixtures were produced in a flow-through box about 1 meter³ equipped with about 8.9 centimeters diameter entrance and exit ports. Cyclohexane was evaporated at room temperature from a small beaker in the box, and mixed with the incoming air. Two squirrel cage circulation blowers in the box provided mixing. The mixture was drawn continuously out of the box and through the sample chamber by an about 11 centimeters diameter muffin fan (Orix 1238A-11B, Oriental Motor, Japan) mounted downstream of the sample. At steady state, challenge concentrations varied less than about 5% over the sample period, and in most cases less than about 2%. During sample changeover, flow was diverted through an auxiliary fan and duct to minimize concentration perturbation.

Pressure drop across the sample was monitored with a digital manometer (Dwyer Series 475, Dwyer Instruments, Michigan City, Ind.) through separate sample ports upstream and downstream from the filter. Flow velocities were measured at the opening to the box, using an air velocity meter (TSI Model 8330 Velocicheck, TSI Incorporated, St. Paul, Minn.) and converted to face velocities at the sample.

After sample mounting, concentration readings were taken for a few minutes on the entrance side of the filter, until a reasonably steady state was reached, and then three or four readings were averaged to determine the challenge or entering concentration. The sampling tube to the detector was then switched to monitor concentrations coming out of the filter. Since filter efficiency decreases as gas is absorbed, both concentration and time after sample placement were recorded. The detector was set to draw gas samples at 1 minute intervals from the flowing stream; the sampling tube was switched during the off cycle.

As shown in Table 3, the sinusoidal channel filters consistently showed higher adsorption efficiencies compared to their straight channel counterparts, but had similar pressure drops. Additional experiments at lower and higher challenge concentrations with these configurations confirmed this trend, also shown in Table 3.

A similar set of comparative experiments were run on samples made with plates having the open sinusoidal pattern #4, as listed above in Example 1 (about 0.406 centimeters diameter (copper) wire, about 0.40 centimeters amplitude, about 2 centimeters wavelength and about 0.90 centimeters row-to-row spacing). Again about 300 grams/meter² carbon loaded web was embossed and a layer of flat paper adhered before removing from the mold. These corrugated composite layers were stacked about 12 deep (5.1 cm), with Spraybond adhesive between layers as before, cross-cut to about 4.8 centimeters thickness in the sample direction (about 15 centimeters long), and mounted as previously (composite weight: about 39.0–40.0 grams, or approximately 26 grams carbon).

While the adsorption efficiencies for these very open structures are low, there is a similar trend. As shown in Table 4, the sinusoidal channel filters again had higher single pass efficiencies than their straight channel counterparts. In this case, however, pressure drops for the sinusoidal pattern filters were correspondingly higher.

TABLE 3

Comparison of 0.244 cm diameter high amplitude sinusoidal pattern with 0.244 cm diameter straight pattern

| | Sinusoidal Channel Pattern Cyclohexane Concentration (ppm) | | | | Straight Channel Pattern Cyclohexane Concentration (ppm) | | |
|---|---|---|---|---|---|---|---|
| Time | Entering Filter | Exiting Filter | Efficiency (%) | Time | Entering Filter | Exiting Filter | Efficiency |
| Experiment #1 | | | | | | | |
| 4:13 | 178 | | | 3:58 | 182 | | |
| 5:08 | 182 | | | 4:58 | 185 | | |
| 6:03 | 181 | | | 5:58 | 180 | | |
| 7:00 | | 83.4 | 54 | 7:03 | | 113 | 38 |
| 8:00 | | 90.4 | 50 | 7:59 | | 115 | 37 |
| 9:00 | | 92.2 | 49 | 8:58 | | 118 | 35 |
| 10:00 | | 91.6 | 49 | 9:58 | | 119 | 35 |
| 11:15 | | 96.2 | 47 | 10:57 | | 121 | 34 |
| 12:10 | | 98.5 | 45 | 11:58 | | 119 | 35 |
| 13:05 | 185 | | | 12:58 | | 126 | 31 |
| 14:00 | 186 | | | 13:58 | | 125 | 31 |
| 15:01 | 186 | | | 14:58 | | 126 | 31 |
| 16:01 | 183 | | | 15:58 | | 130 | 29 |
| 17:01 | 188 | | | 17:25 | 193 | | |
| | | | | 18:19 | 182 | | |
| | | | | 19:14 | 187 | | |
| | | | | 20:09 | 191 | | |
| | | | | 21:04 | 185 | | |
| Experiment #2 | | | | | | | |
| 3:02 | | 67.7 | 61 | 2:45 | | 92.1 | 42 |
| 3:59 | | 73.1 | 58 | 3:41 | | 91.5 | 42 |
| 5:00 | | 75.1 | 55.5 | 4:37 | | 93.3 | 41 |
| 6:00 | | 80.8 | 53 | 5:37 | | 98.9 | 38 |
| 7:00 | | 83.8 | 51 | 6:37 | | 98.6 | 38 |
| 7:59 | | 85.7 | 50 | 7:37 | | 101 | 36 |
| 8:59 | | 86.9 | 50 | 8:51 | | 102 | 36 |
| 9:59 | | 92.8 | 48 | 9:45 | | 99.7 | 37 |
| 10:59 | | 91.8 | 47 | 10:39 | | 101 | 36 |
| 12:27 | | 95.9 | 44 | 12:37 | | 105 | 35 |
| 13:22 | 166 | | | 13:37 | 159 | | |
| 14:17 | 164 | | | 14:37 | 160 | | |
| 15:11 | 171 | | | 15:37 | 157 | | |
| 16:07 | 180 | | | 16:37 | 160 | | |
| 17:01 | 175 | | | 17:37 | 158 | | |
| 17:59 | 175 | | | | | | |
| Pressure Drop: 6.9 mm H$_2$O | | | | Pressure Drop: 6.4 mm H$_2$O | | | |

TABLE 4

Comparison of .406 cm diameter low amplitude sinusoidal channel pattern with .406 cm diameter straight pattern

| | Sinusoidal Channel Cyclohexane Concentration (ppm) | | | | Straight Channel Cyclohexane Concentration (ppm) | | |
|---|---|---|---|---|---|---|---|
| Time | Entering Filter | Exiting Filter | Efficiency (%) | Time | Entering Filter | Exiting Filter | Efficiency (%) |
| 2:59 | 60.7 | | | | | | |
| 3:59 | 59.8 | | | 3:41 | 60.4 | | |
| 5:05 | 58.7 | | | 4:40 | 59.9 | | |
| 5:59 | 59.2 | | | 5:40 | 58 | | |
| 6:59 | | 39.1 | 34 | 6:40 | 58.1 | | |
| 7:59 | | 38.9 | 35 | 7:45 | | 46.2 | 22 |
| 8:59 | | 40.2 | 33 | 8:49 | | 46.9 | 21 |
| 9:59 | | 40.5 | 32 | 9:44 | | 46.4 | 21 |
| 10:59 | | 40.6 | 32 | 10:40 | | 45.7 | 23 |
| 11:59 | | 40.6 | 32 | 11:41 | | 46 | 22 |
| 12:59 | | 41.6 | 30 | 12:41 | | 46.3 | 22 |
| 13:59 | | 41.5 | 30 | 13:41 | | 46.1 | 22 |
| 15:27 | | 41.6 | 30 | 15:41 | | 47.1 | 20 |
| 17:16 | | 41.6 | 30 | | | | |
| 22:59 | | 41.1 | 31 | 16:40 | 56.1 | | |
| 26:07 | 54.3 | | | 17:46 | 54.5 | | |

TABLE 4-continued

Comparison of .406 cm diameter low amplitude sinusoidal channel pattern with .406 cm diameter straight pattern

| | Sinusoidal Channel Cyclohexane Concentration (ppm) | | | | Straight Channel Cyclohexane Concentration (ppm) | | |
| --- | --- | --- | --- | --- | --- | --- | --- |
| Time | Entering Filter | Exiting Filter | Efficiency (%) | Time | Entering Filter | Exiting Filter | Efficiency (%) |
| 27:01 | 55 | | | 18.42 | 55.1 | | |
| 27:58 | 55.4 | | | 19:40 | 55.8 | | |
| 28:59 | 56 | | | 20:40 | 55.7 | | |
| 29:59 | 55.3 | | | | | | |
| | Pressure Drop: 3.8 mm H$_2$O | | | | Pressure Drop: 1.8 mm H$_2$O | | |

Example 3
Active Channel Flow Filter.

A channel flow medium was formed comprising a carbon loaded web containing about 80% by weight Calgon 80×325 mesh carbon and about 20% by weight blown microfiber (BMF) (about 8–12 micrometers effective fiber diameter). The fiber strand of the BMF had three layers: a center layer of polypropylene (about 75% of the total weight) and top and bottom layers of propylene-hexene copolymer adhesive (about 25% of the total weight). The web had about 250 grams/meter overall basis weight.

Sinusoidally shaped channels were embossed into sheets of the loaded web by hot pressing between about 24.1 centimeters by 22.9 centimeters (9.5 inches×9 inches) patterned plates with a force of approximately 17,792 Newtons (about 4000 pounds), a temperature of about 70 degrees C. and a dwell time of about 30 seconds. Layers were then stacked with channels running in the same direction. Strands of hot melt (Minnesota Mining and Manufacturing Company Spray-Bond Adhesive 6111) were laid down between the layers with a Minnesota Mining and Manufacturing Company Spray Bond Applicator to produce a sponge-like stack. Layers were stacked until the pile was about 5.1 centimeters (2 inches) high. The stack was then cross-cut into about 5.1 centimeters (2 inches) thick filters, cutting about 90 degrees to the channel direction with a serrated edge band saw. (The face of these filters resembles FIG. 2.) The filters had a cross-section of approximately 5.1 centimeters by 22.9 centimeters (2 inches×9 inches), were flexible and self-supporting, and resembled an open cell sponge. To make the larger filter to go on the box fan, several of these 5.1 centimeters by 22.9 centimeters (2 inches×9 inches) segments were glued together and fitted with a cardboard frame to form two about 34.3 centimeters by 45.7 centimeters (13.5 inches×18 inches) filters (with about 5.1 centimeters (2 inches) thickness in the flow direction), similar to filter 700 shown in FIG. 8.

Following clearing tests on the solvent components of various paints, and on paint tests (summarized below) using a one cubic meter box, an about 3.8 meters by 3.7 meters by 2.4 meters (12.5 feet×12 feet×7 feet 9 inch) test "room" was built inside a garage. It was built from two-by-fours and about 0.15 millimeters (0.006 inches) thick polyethylene, with a plastic film door and window that could be sealed with tape. Film covered all six sides, including the floor, and was carefully sealed with duct tape around all edges and corners. An exhaust fan was placed in the window, a large circulation fan was included to minimize concentration gradients and aid drying, and an oil heater was included to help control temperature. Solvent concentrations were monitored with a Bruel and Kjer photo-acoustic IR multi-gas detector, sampling the room air through about 3.18 millimeters diameter (⅛ inch) tubes running through the wall. The [C-H] stretch frequency was monitored using a hexane-based calibration for mineral spirits, developed during experiments in the one cubic meter box.

The standard routine was to apply about 3.78 liters (one gallon) of paint by roller to nine 1.2 meters by 2.4 meters (4 feet×8 feet) plywood panels covered on both sides with paper, vent during painting (about 15 minutes), and then vent the room for a total of about 3 hours (including the time of painting). The test room was vented with the exhaust fan mounted in the window, the door partially open, and heater and circulation fan on. Concentrations typically reached several hundred PPM during venting and then decreased. Once the concentration had reduced to about 35 to 40 PPM, the filter unit was placed, the room was sealed, the circulation fan and heater were left on, and the concentration was monitored for several hours. During venting, the temperature was between about 9 and 11 degrees C., and stayed there throughout the remainder of the test.

Figure 13:
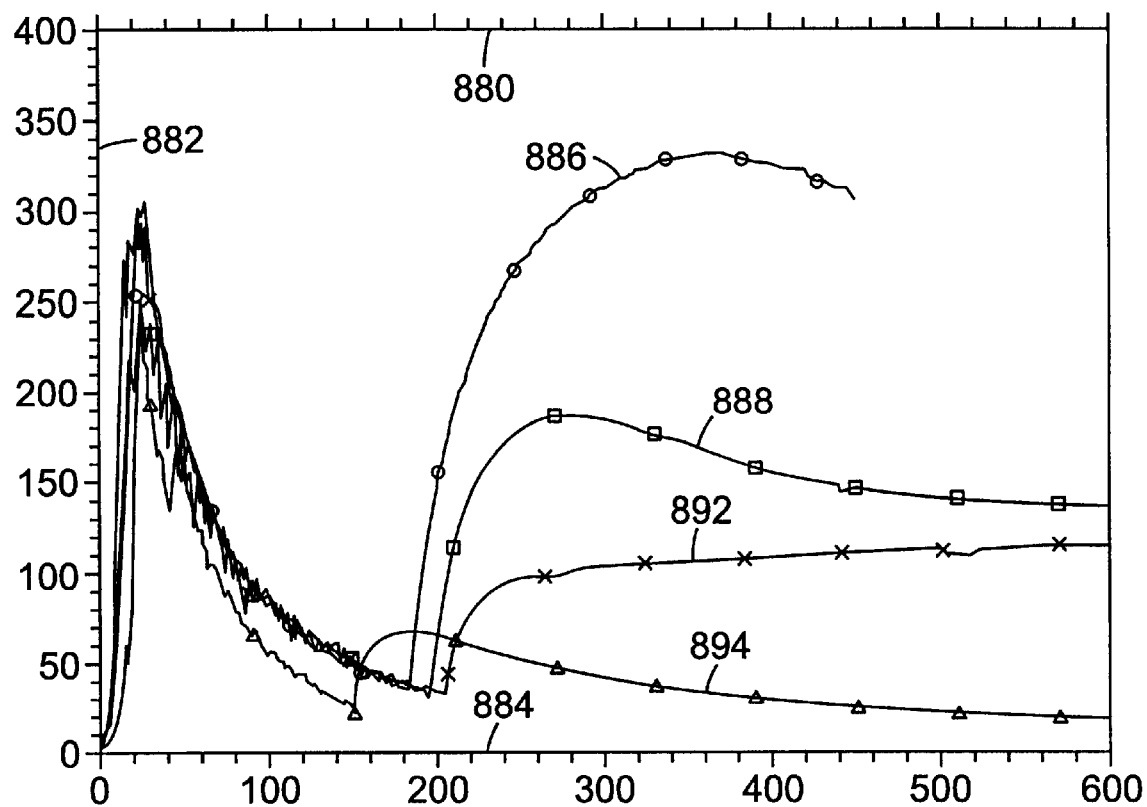
FIG. 13 is a plot of vapor concentrations versus time for different channel flow filter configurations tested in an active filter application, wherein the solvent was evaporated from an oil based paint.

Five experiments were run using oil-based paint. In FIG. 13, a plot 880 shows the results of the five experiments with the concentrations in ppm (along axis 882) plotted against time in minutes (along axis 884):
a. Baseline (No filter unit)—Curve 886

The first concentration spike is the flash occurring during painting and immediately afterward. After 3 hours of vented drying, and after the concentration had tapered to about 35–40 PPM, the room was sealed up and the residual VOC concentration was monitored. It slowly climbed back to about 330 PPM.
b. Channel Flow Filter: 34.3 cm by 45.7 cm by 5.1 cm (13.5"×18"×2"); Box Fan: 50.8 cm by 50.8 cm (20"×20")—Curve 892

The channel flow filter was mounted to the exit side of the fan; remaining area was masked off with duct tape. With the fan running on the high setting, the flow velocity was measured at several points across the face of the filter, using a TSI Velocicheck anemometer. It varied widely, but averaged about 3.8 m/sec (740 ft/min).

The same painting and venting procedure was followed, and after the concentration had reached about 35–40 PPM, the filter unit was placed and the room was sealed. This filter combination (with the fan on the high setting) kept the VOC concentration at about 100 PPM.
c. Channel Flow Filter: 50.8 cm by 50.8 cm by 5.1 cm (20"×20"×2"); Box Fan: 50.8 cm by 50.8 cm (20"×20")—Curve 894

Following the same procedure, the larger filter unit was placed in the system. This filter combination (again with a high fan setting) kept the VOC level below about 70 PPM, and gradually reduced it to less than about 30 PPM.

d. Drapes of Carbon (Passive Filter): About 650 grams of Carbon Loaded web—Curve 888

In the fourth experiment, an approximately equivalent quantity (650 grams) of the carbon loaded web was draped over hooks suspended from the roof of the "room", with only the air flow in the room from the circulating fan. This significantly reduced the VOC concentration compared to the baseline, but was not nearly as effective as the filter/box fan combination. This illustrates the importance of the channel flow structure, and the air flow through it.

The ability of these same channel flow filters to clear solvents coming from water-based latex paint (VOC: ethylene glycol) and a commonly used sealant, KILZ (VOC: ethanol, methanol, isopropyl alcohol and "alkanes") was also tested. Lab scale tests were run on about 4.5 centimeters×15 centimeters samples of the channel flow filters in a one cubic meter box (1:28 scale of the "room"). Filter samples were mounted on slides and inserted into a flow-through sample chamber of a recirculation device. The sample chamber was mounted to a Dayton squirrel cage blower through a manifold. Flow through the filter was adjusted to achieve an average face velocity at the exit port of about 2 meter/sec. This re-circulating filter assembly was placed inside the one cubic meter box.

Poster board panels were painted with a total of about 40 grams of the KILZ (approximately 12 grams of solvent) outside of the box, and then transferred immediately to the box. The box was aerated for about 12 minutes by drawing air through the two about 8.9 centimeter (3½ inch) blast gate vents. Solvent concentrations in the box were monitored with the B&K detector.

Figure 14:
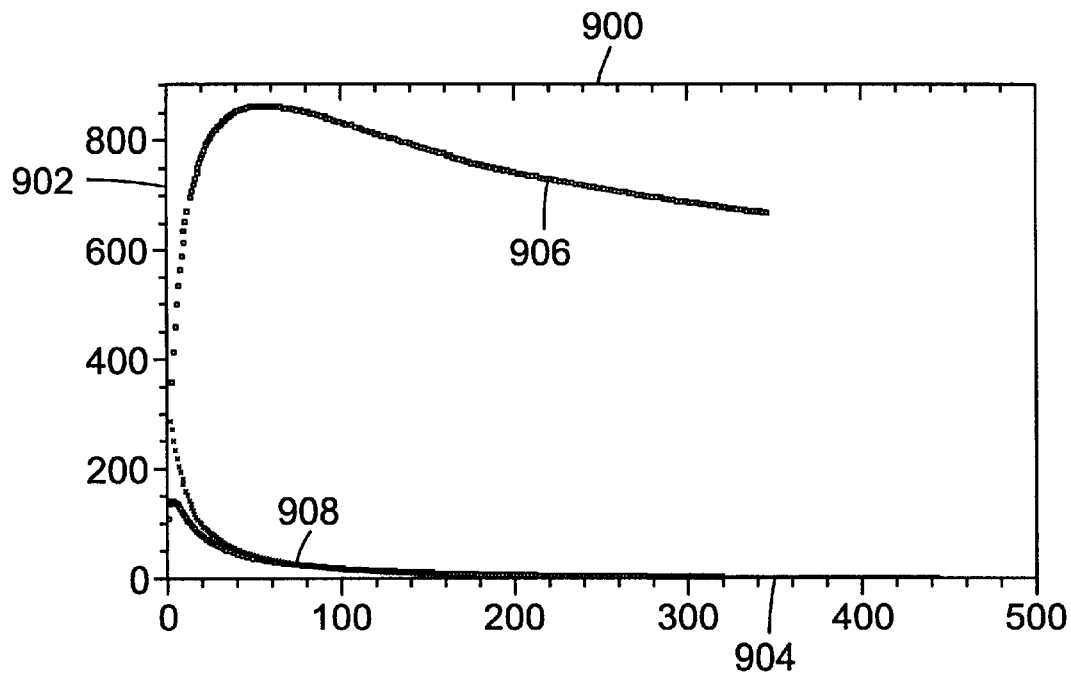
FIG. 14 is a plot of vapor concentrations versus time for a channel flow filter configuration tested in another active filter application, wherein the solvent was evaporated from a commonly used sealant.

In FIG. 14, a plot 900 shows the results of the KILZ test with VOC concentrations in ppm (along axis 902), plotted against time in minutes (along axis 904). First a baseline was run with no filter unit in the box, Curve 906. Then the process was repeated, with placement of the recirculating unit at the end of the about 12 minute aeration period, Curve 908. The filter did a very good job of reducing and maintaining the VOC level in the box.

Figure 15:
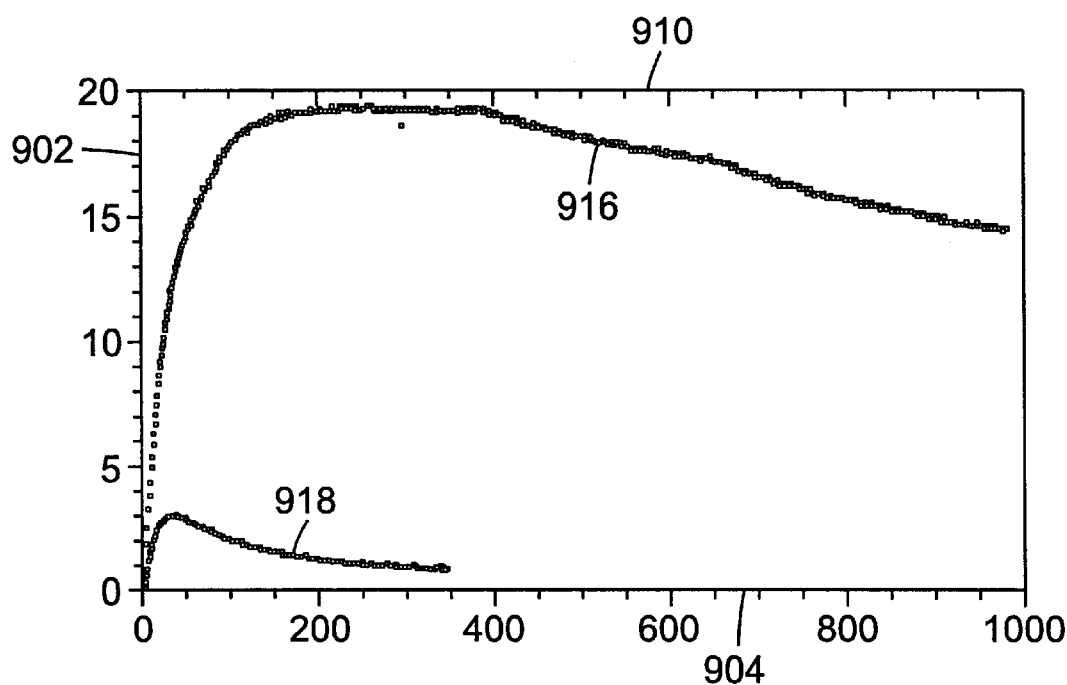
FIG. 15 is a plot of vapor concentrations versus time for a channel flow filter configuration tested in the same active filter application as FIG. 14, wherein the solvent was evaporated from latex paint.

Similarly, about 40 grams of water based latex paint was applied to poster board, transferred, aerated and tested with the about 4.5 centimeters×15 centimeters channel flow filter. In FIG. 15, a plot 910 shows the results of the latex test with VOC concentrations in ppm (along axis 912), plotted against time in minutes (along axis 914). A baseline was run (Curve 916). Then the test was repeated with the re-circulating filter unit in the box for the latex covered boards (Curve 918). The channel flow filter was also effective in reducing and maintaining the concentration of VOC's generated by the water-based paint.

Example 4
Passive Channel Flow Barrel Filter.

Figure 16:
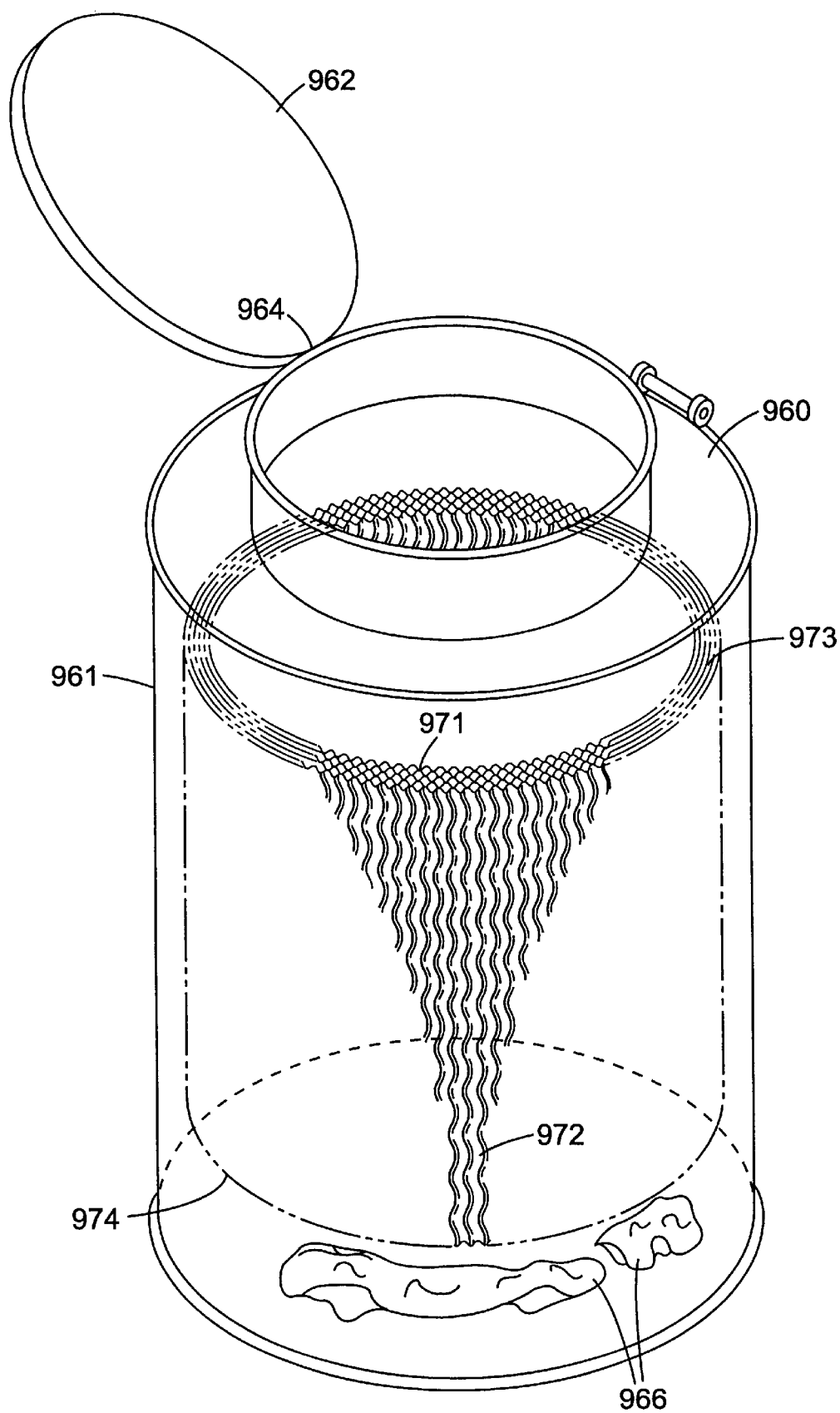
FIG. 16 is a schematic illustration of a stacked channel flow filter formed as a sleeve lining a barrel in a passive filter application.

Referring now to FIG. 16, a passive channel flow filter 970 is used in a barrel 960 to remove vapors from solvent loaded rags 966 placed in the barrel 960 for storage. The barrel 960 (or drum) is typically found in maintenance shops for the storage of solvent filled cleaning rags 966, and is provided with a lid 962 connected at a hinge 964 that can be hermetically sealed between openings.

A standard barrel 960, about 81.3 centimeters (about 32 inches) high, is modified to include sample ports formed from bulkhead connectors and copper tubing built into the wall. A B&K photo-acoustic IR detector is used to sample the internal concentration of the barrel through these ports. A stacked channel flow filter sleeve 970 is formed from five layers 971 of carbon loaded adhesive-BMF filter web having a plurality of channels 972 formed therein. The filter sleeve 970 is formed from continuous formed filter web attached to a backing scrim, which is then rolled up around a barrel-shaped form until the five layers 971 are achieved; each of the layers are adhered together by spray bond adhesive. The filter sleeve 970 has an outer diameter slightly less than the inner diameter of the barrel so as to line the inside of the barrel 960. The filter sleeve web material is chosen such that the resulting overall amount of carbon within the filter sleeve is about 2000 grams of carbon.

The filter sleeve 970 is about 61 centimeters (about 24 inches) deep, such that the tortuous continuous channels 972 formed in the filter web layers 971 are about 61 centimeters (about 24 inches) long. The filter sleeve 970 is mounted in the barrel 960 near the top of the barrel using hooks (not shown) mounted around the barrel's inner wall about 61 centimeters (about 24 inches) down from the top of the barrel. The filter sleeve 970 is set to rest within these hooks. In this mounting configuration, the first face 973 of the channel flow filter sleeve 970 is near the top of the barrel 960 and is substantially perpendicular to the wall 961 of the barrel 960. In like manner, the second face 974 of the filter sleeve is positioned substantially perpendicular to the wall 961 of the barrel 960 at about 61 centimeters (about 24 inches) from the top of the barrel 960.

Figure 17:
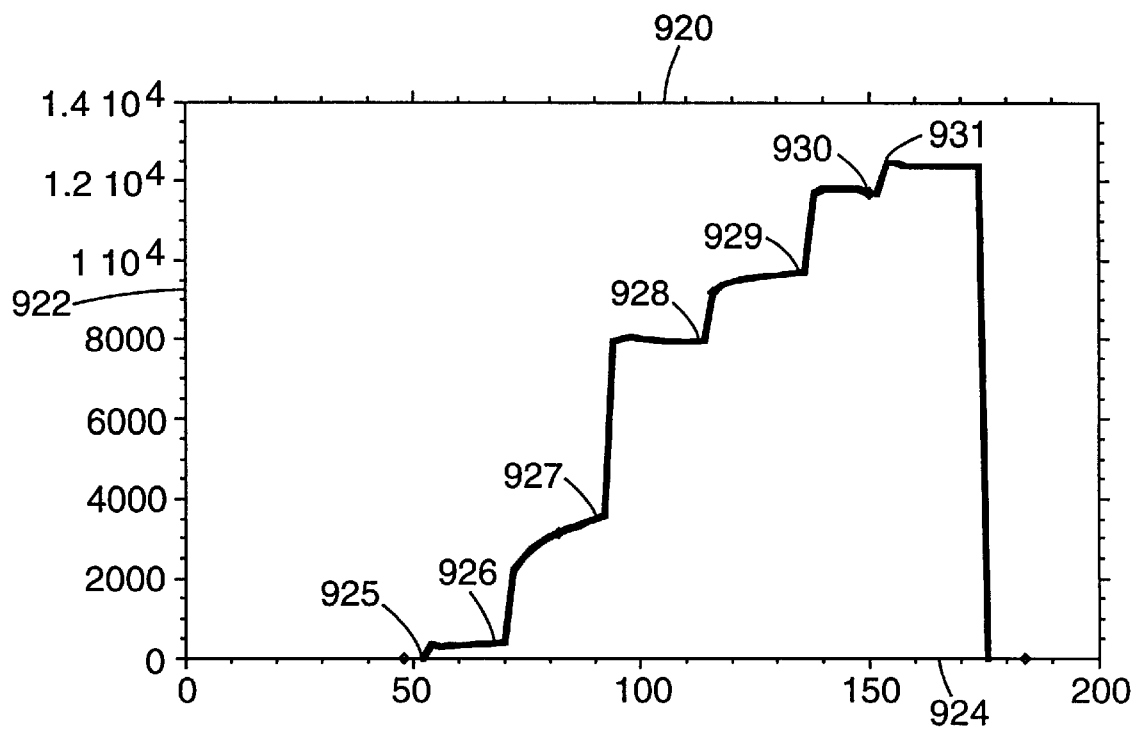
FIG. 17 is a plot of vapor concentrations versus time tested in a barrel without a filter as solvent loaded material is added to the barrel.

A barrel test on the concentration variation of solvent within the barrel with and without the channel flow filter sleeve is run by dropping rags containing a fixed amount of solvent into the barrel and measuring the concentration levels using the B&K detector. In a first test, solvent dosed rags containing 15 cubic centimeters (cc) per 3 rags are dropped into an empty unlined barrel. In FIG. 17, a plot 920 shows the solvent concentration in ppm (along axis 922) plotted against time in minutes (along axis 924). At each of the data points 925, 926, 927 and 928, 3 rags with about 15 cc of solvent are added to the barrel for a total volume of about 60 cc at data point 928. At both data points 929 and 930, about 30 cc of solvent are added to the barrel, and at data point 931 an additional about 60 cc of solvent is added to the barrel. A total of about 180 cc of solvent is added to the barrel.

As can be seen on the plot 920, the concentration levels will rise quickly to unsafe concentrations, such that at about 120 cc, in about 150 minutes, the solvent concentration is in the range of about 12,500 ppm which would cause the detector to stop reading. Since the lower explosive limit (LEL) for toluene is 12,000 ppm, this is potentially an unsafe situation.

Figure 18:
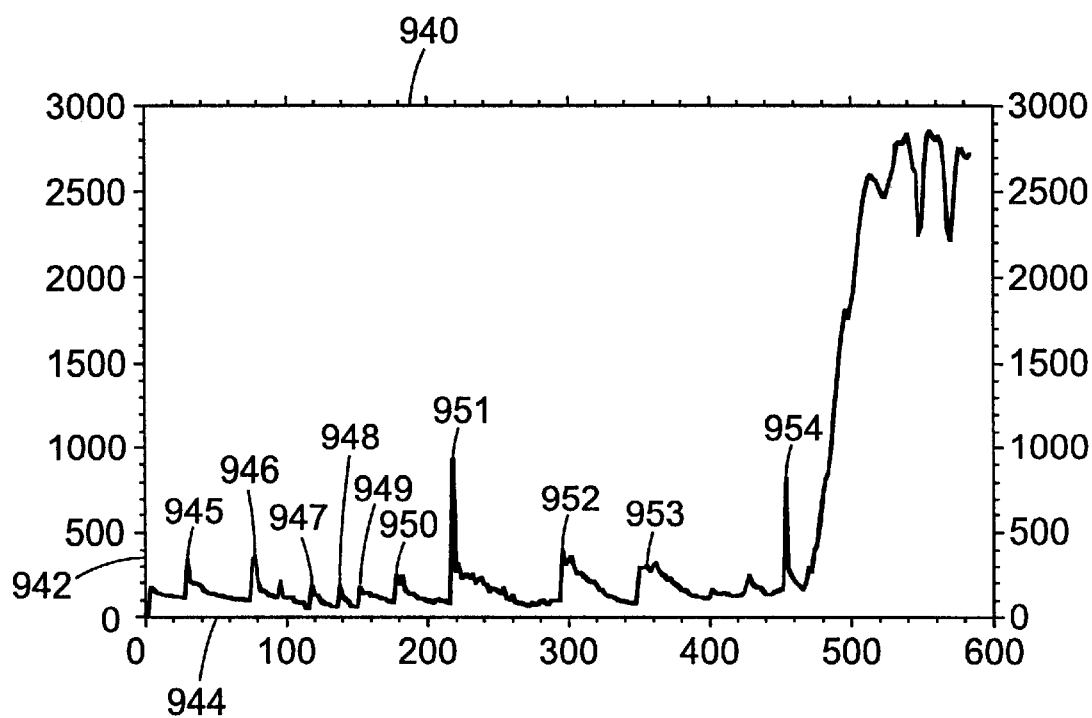
FIG. 18 is a plot of vapor concentrations versus time tested in a barrel lined with a stacked channel flow filter sleeve as solvent loaded material is added to the barrel.

In a second test, the barrel is lined with the stacked channel flow barrel filter described above. Solvent dose rags are again dropped into the lined barrel, and the concentration readings are recorded. In FIG. 18, a plot 940 shows the solvent concentration in ppm (along axis 942) plotted against time in minutes (along axis 944). At each of the data points 945, 946, 947, and 948, about 15 cc of solvent are added on rags into the barrel. At data points 949 and 950, about 30 cc of solvent are added on rags into the barrel. At data points 951 and 952, about 60 cc of solvent are added on rags into the barrel, and at data points 953 and 954, about 100 cc of solvent are added on rags into the barrel. The total volume of solvent in the barrel is about 440 cc on about 42 rags.

As can be seen on plot 940, the concentrations of the solvent within the barrel spike as rags are added to the barrel, but then ramp downward to maintain lower levels of solvent vapor in the barrel, in the range of less than about 500 ppm. This lower level is maintained even with the higher volume of solvent in the barrel.

Example 5
Particle and Odor Adsorbing Furnace Filter.

An about 2.5 cm (1 inch) thick channel flow filter with about a 51 cm×51 cm (about 20 inch by 20 inch) face was constructed by the methods described in Example 3, and mounted in a cardboard frame. A flat layer of 3M Filtrete BMF particle capture media (3M GCB 30) was mounted to one side of the channel flow filter, and a layer of a polypropylene (Claf) scrim to the opposite side (sample #GCB30-CF-C). A second sample was constructed with a layer of particle capture media (3M GCB 30) mounted to both sides of the channel flow filter (Sample #GCB30-CF-GCB30). These combination filters and a control, a 3M Allergy Relief Filter (ARF), which is a pleated filter constructed with Filtrete GCB 50 (a higher basis weight version of GCB 30), were tested for fractional efficiency for capture of aerosolized NaCl and for pressure drop. These tests were run under a confidentiality agreement at an independent testing lab. The test methods used are outlined in Advances in Filtration and Separation Technology, Volume 11, 1997 AFS, Edited by Robert Baumann and Lloyd Weisert.

Figure 19:
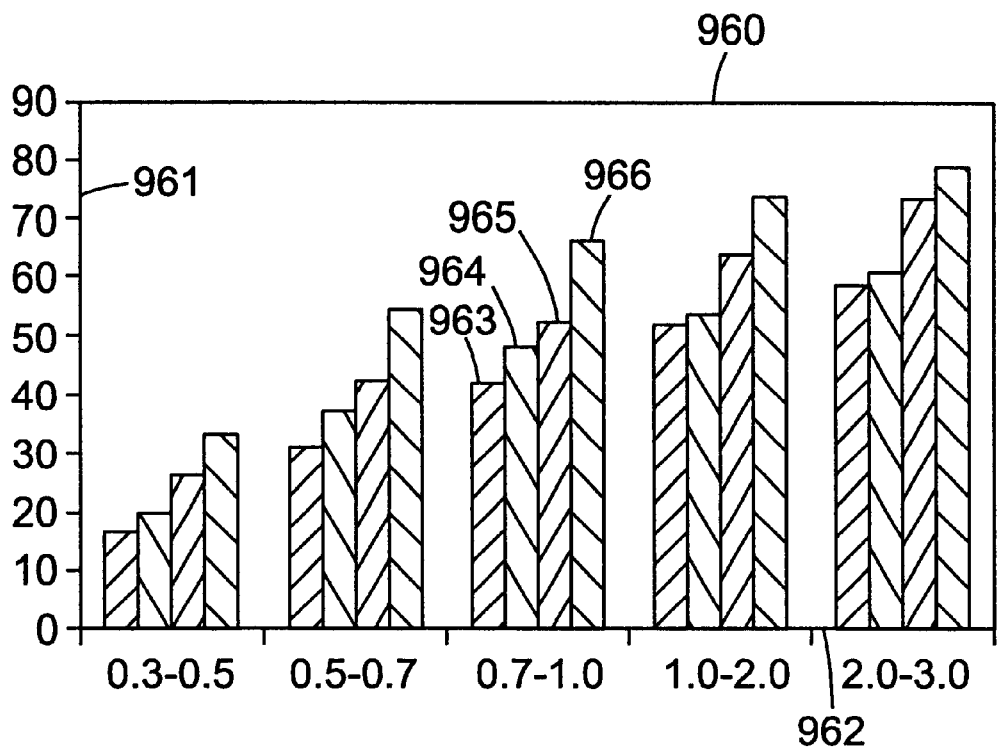
FIG. 19 is a bar graph of fractional efficiencies versus particle size ranges for various channel flow filter samples and a control sample tested for particle and odor adsorption.
Figure 20:
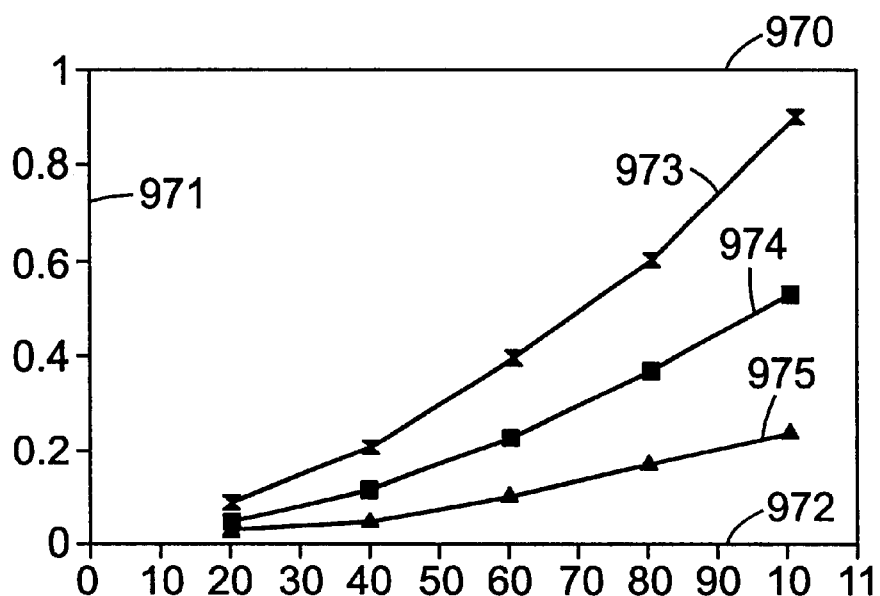
FIG. 20 is a plot of pressure drop versus face velocity for the samples of FIG. 19.

Fractional efficiencies and pressure drops for these samples are shown in FIGS. 19 and 20. In FIG. 19, a bar graph 960 shows the fractional efficiency in percent (along axis 961) plotted against particle size ranges in microns (along axis 962). Bars 963 show the fractional efficiency variations for differing particle size ranges for sample GCB30-CF-C. Bars 964 show the fractional efficiency variations for differing particle size ranges for sample C-CF-GCB30, which is the same as sample GCB30-CF-C only with the exit and entrance sides reversed. Bars 965 show the fractional efficiency variations for differing particle size ranges for the control sample ARF. Bars 966 show the fractional efficiency variations for differing particle size ranges for sample GCB30-CF-GCB30. These combination filters effectively removed particulate of various particle size from an air stream.

In FIG. 20, a plot 970 shows the pressure drop in inches of $H_2O$ (along axis 971) plotted against face velocity in feet/minute (along axis 972) for the above samples. Curve 973 shows the test results for sample GCB30-CF-GCB30; curve 974 shows the test results for sample C-CF-GCB30; and curve 975 shows the test results for the control ARF.

A similar filter with an about 2.2 cm (0.875 inch) thick channel flow layer and a flat layer of Filtrete GCB 30 was tested in a forced air equipped house of about 223 square meters (2400 square feet). The house was dosed with low levels of cyclo-hexane by mildly heating a metal beaker of cyclo-hexane near an intake vent. Concentration of the cyclo-hexane was monitored in another location in the house, using the B&K detector. Baseline decays of the concentration were established before and after placement of the filter in the filter slot at the intake to the furnace. With the filter in place in the re-circulation unit, decay in concentration of cyclo-hexane was significantly more rapid than during either of the two baseline periods. It required about 20 minutes to reduce levels from about 33 to about 27 ppm without the filter, and about 9 minutes to reduce levels from about 33 to about 27 ppm with the filter. Thus, this combination filter also was capable of absorbing potential odors from a home.

The complete disclosures of all patents, patent applications, and publications are incorporated herein by reference as if individually incorporated. Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A method of using a filtration medium having high efficiency and a low pressure drop to reduce vapor concentration levels in an area, the method comprising the steps of:

providing a filtration medium having a plurality of filtration layers formed from non-woven filter material including multi-layer fiber strands that have a polymer core and at least one outer layer of adhesive material to which sorbent particulate matter is adhered, wherein at least one filtration layer has a multi-dimensional channel pattern formed therein creating a plurality of continuous, tortuous channels across the at least one layer and a multi-dimensional edge at each end of the plurality of channels, the plurality of filtration layers configured as a stack with the channel pattern of the at least one layer defining a plurality of inlets open through a first face of the stack, a corresponding plurality of disruptive fluid pathways through the stack, and a plurality of outlets open through a second face of the stack; and placing the filtration medium in the area where vapor concentration levels are to be reduced.

2. The method of claim 1, wherein the area is a barrel and the step of placing the filtration medium includes placing the filtration medium inside the barrel.

3. The method of claim 2, further comprising the step of forming a sleeve from the filtration medium, the sleeve configured to line the inside perimeter of the barrel when the sleeve is placed in the barrel.

4. The method of claim 3, wherein the step of forming further comprises aligning the plurality of channels of the filtration medium such that the inlets and the outlets of the filtration medium are positioned near the top and bottom of the barrel, respectively.

5. The method of claim 4, wherein the non-woven filter material comprises a blown microfiber material and wherein the sorbent particulate matter comprises carbon.

6. The method of claim 1, wherein the area is a freshly painted room, and the step of placing the filtration medium includes placing the filtration medium within the room for the reduction of paint vapors within the room.

7. The method of claim 6, further comprising the step of forming a box-shaped filter from the filtration medium.

8. The method of claim 7, wherein the step of placing the filtration medium includes mounting the box-shaped filter adjacent a fan configured to move air within the room through the box-shaped filter.

9. The method of claim 1, wherein the area is a building, and the step of placing the filtration medium includes placing the filtration medium relative to the air circulation unit of the building.

10. The method of claim 9, further comprising the step of forming a box-shaped filter from the filtration medium.

11. The method of claim 10, wherein the step of placing the filtration medium includes placing the box-shaped filter at an intake vent of a forced air furnace.

12. The method of claim 11, wherein the step of forming includes placing an additional layer of filtration material adjacent a face of the filtration medium.

13. A method of using a filtration medium having high efficiency and a low pressure drop to reduce vapor concentration levels in a barrel, the method comprising the steps of:

providing a filtration medium having a plurality of filtration layers, wherein at least one filtration layer has a multi-dimensional channel pattern formed therein creating a plurality of continuous, tortuous channels across the at least one layer and a multi-dimensional edge at each end of the plurality of channels, the plurality of filtration layers configured as a stack with the channel pattern of the at least one layer defining a plurality of inlets open through a first face of the stack, a corresponding plurality of disruptive fluid pathways through the stack, and a plurality of outlets open through a second face of the stack; and placing the filtration medium in the barrel where vapor concentration levels are to be reduced.

14. The method of claim 13, further comprising the step of forming a sleeve from the filtration medium, the sleeve configured to line the inside perimeter of the barrel when the sleeve is placed in the barrel.

15. The method of claim 14, wherein the step of forming further comprises aligning the plurality of channels of the filtration medium such that the inlets and the outlets of the filtration medium are positioned near the top and bottom of the barrel, respectively.

16. The method of claim 15, wherein the filtration medium is formed from a carbon loaded multi-layer blown microfiber non-woven web.

17. A filtration medium possessing high efficiency and low pressure drop comprising:

a plurality of filtration layers wherein at least one layer has a multi-dimensional channel pattern formed therein creating a plurality of continuous, tortuous channels across the at least one layer and a multi-dimensional edge at each end of the plurality of channels, the plurality of filtration layers configured as a stack with the channel pattern of the at least one layer forming a plurality of inlets open through a first face of the stack, a plurality of outlets open through a second face of the stack and a corresponding plurality of disruptive fluid pathways passing from the inlets through the stack to the outlets, with at least some of the plurality of filtration layers formed from non-woven filter material including multi-layer fiber strands that have a polymer core and at least one outer layer of adhesive material.

18. The filtration medium of claim 17, wherein substantially all of the filtration layers have a channel pattern formed therein.

19. The filtration medium of claim 17, wherein alternating fitration layers have a channel pattern formed therein.

20. The filtration medium of claim 17, wherein all of the filtration layers are formed from the non-woven filter material.

21. The filtration medium of claim 17, wherein the filter material comprises a blown microfiber web.

22. The filtration medium of claim 17, wherein the first face and the second face are one of parallel or non-parallel.

23. The filtration medium of claim 17, further comprising a planar web interposed between at least two of the filtration layers.

24. The filtration medium of claim 23, wherein the planar web comprises one of a scrim, a filtration medium or a film.

25. The filtration medium of claim 17, wherein the filtration material comprises a blown microfiber web having at least two outer layers of adhesive material to which sorbent particulate matter is adhered, the sorbent particulate matter including carbon.

26. The filtration medium of claim 17, wherein the filtration layer comprises sorbent particulate matter, the particulate matter adhering to the fiber strands of the non-woven web at the adhesive layers of the fiber strands.

27. The filtration medium of claim 26, wherein the sorbent particulate matter comprises carbon.

28. The filtration medium of claim 17, wherein at least two adjacent filtration layers comprise different channel patterns.

29. The filtration medium of claim 17, wherein the plurality of channels of the channel pattern comprise parallel channels.

30. The filtration medium of claim 17, wherein each channel of the plurality of channels comprise a substantially smooth curve.

31. The filtration medium of claim 17, wherein each channel of the plurality of channels comprise a plurality of fluidly connected contiguous linear segments.

32. The filtration medium of claim 17, wherein the multi-dimensional edge at each end of the channels on the at least one layer comprises a substantially smooth curve formed perpendicular to a plane defined by a surface of the at least one filtration layer.

33. A filtration medium possessing high efficiency and low pressure drop comprising:

a plurality of filtration layers wherein at least one layer has a multi-dimensional channel pattern formed therein creating a plurality of continuous, tortuous channels across the at least one layer and a multi-dimensional edge at each end of the plurality of channels, each tortuous channel configured as a repeating plurality of undulations including at least two wave lengths along a length of the channel for causing increased perturbation of a fluid stream passing through the channel, the plurality of filtration layers configured as a stack with the channel pattern of the at least one layer forming a plurality of inlets open through a first face of the stack, a plurality of outlets open through a second face of the stack and a corresponding plurality of disruptive fluid pathways passing from the inlets through the stack to the outlets.

34. A method of forming a filtration medium having high efficiency and a low pressure drop, the method comprising the steps of:

providing a filtration web formed as a non-woven web including multi-layer fiber strands that have a polymer core and at least one outer layer of adhesive material;

forming a multi-dimensional channel pattern in at least a portion of the filtration web, the channel pattern creating a plurality of continuous, tortuous channels across the filtration web and a multi-dimensional edge at each end of the plurality of channels on the filtration web;

forming a plurality of filtration layers from the filtration web, at least one filtration layer being formed from the multi-dimensional channel pattern portion of the filtration web; and stacking the plurality of filtration layers such that the multi-dimensional channel pattern of the at least one layer creates a plurality of inlets open through a first face of the stack, a plurality of outlets open through a second face of the stack and a corresponding plurality of disruptive fluid pathways passing from the inlets through the stack to the outlets.

35. The method of claim 34, further comprising the step of applying an adhesive between adjacent layers of the plurality of filtration layers.

36. The method of claim 34, wherein the step of forming the multi-dimensional channel pattern includes forming the pattern in at least half of the filtration layers, and the step of stacking includes alternating filtration layers with formed multi-dimensional channel patterns with filtration layers without formed multi-dimensional channel patterns.

37. The method of claim 36, wherein the step of forming the multi-dimensional channel pattern includes forming the pattern in substantially all of the filtration layers.

38. The method of claim 34, wherein the step of forming the multi-dimensional channel pattern includes forming the plurality of channels in parallel.

39. The method of claim 34, wherein the step of forming the multi-dimensional channel pattern includes forming each channel of the plurality of channels as a substantially smooth curve.

40. The method of claim 34, wherein the step of forming the multi-dimensional channel pattern includes forming each channel of the plurality of channels from a plurality of fluidly connected contiguous linear segments.

41. The method of claim 34, wherein the step of forming the multi-dimensional channel pattern includes forming the multi-dimensional edge at each end of the channels on the at least one layer as a substantially smooth curve that is perpendicular to a plane defined by a surface of the at least one filtration layer.

42. The method of claim 34, wherein the non-woven filter material further comprises sorbent particulate matter adhered to the polymer core of the fiber strands at the adhesive outer layer.

43. The method of claim 42, wherein the non-woven filter material comprises a blown microfiber web.

44. The method of claim 42, wherein the sorbent particulate matter comprises carbon.

45. The method of claim 34, further comprising the step of loading the filtration layer with sorbent particulate matter, the particulate matter adhering to the fiber strands of the non-woven web at the adhesive layer of the fiber strands.

46. The method of claim 34, wherein the step of forming the multi-dimensional channel pattern comprises embossing the multi-dimensional channel pattern into the filtration web.

47. A method of forming a filtration medium having high efficiency and a low pressure drop, the method comprising the steps of:

providing a plurality of filtration layers formed from a non-woven filter material including multi-layer fiber strands that have a polymer core and at least one outer layer of adhesive material;

forming a multi-dimensional channel pattern in at least one of the plurality of filtration layers, the channel pattern creating a plurality of continuous, tortuous channels across the at least one layer and a multi-dimensional edge at each end of the plurality of channels on the at least one layer; and stacking the plurality of filtration layers such that the multi-dimensional channel pattern of the at least one layer creates a plurality of inlets open through a first face of the stack, a plurality of outlets open through a second face of the stack, and a corresponding plurality of disruptive fluid pathways passing from the inlets through the stack to the outlets.

48. A method of forming a filtration medium having high efficiency and a low pressure drop, the method comprising the steps of:

providing a plurality of filtration layers formed from a non-woven filter material including multi-layer fiber strands that have a polymer core and at least one outer layer of adhesive material, at least one layer of which includes a multi-dimensional channel pattern including a plurality of continuous, tortuous channels across the at least one layer and a multi-dimensional edge at each end of the plurality of channels on the at least one layer; and stacking the plurality of filtration layers such that the multi-dimensional channel pattern of the at least one layer forms a plurality of inlets open through a first face of the stack, a corresponding plurality of disruptive fluid pathways through the stack, and a plurality of outlets open through a second face of the stack.

49. A method of forming a filtration medium having high efficiency and a low pressure drop, the method comprising the steps of:

providing a plurality of filtration layers, at least one layer of which includes a multi-dimensional channel pattern including a plurality of continuous, tortuous channels across the at least one layer and a multi-dimensional edge at each end of the plurality of channels on the at least one layer, each tortuous channel configured as a repeating plurality of undulations including at least two wave lengths along a length of the channel for causing increased perturbation of a fluid stream passing through the channel; and stacking the plurality of filtration layers such that the multi-dimensional channel pattern of the at least one layer forms a plurality of inlets open through a first face of the stack, a corresponding plurality of disruptive fluid pathways through the stack, and a plurality of outlets open through a second face of the stack.

* * * * *